United States Patent [19]
Kikuchi et al.

[11] Patent Number: 5,774,288
[45] Date of Patent: Jun. 30, 1998

[54] DATA RECORDER

[75] Inventors: Akihiro Kikuchi; Yoshihiro Yoshiura, both of Kanagawa, Japan

[73] Assignee: Sony Corporation, Tokyo, Japan

[21] Appl. No.: 587,530

[22] Filed: Jan. 17, 1996

[30] Foreign Application Priority Data

Jan. 20, 1995 [JP] Japan .................................. 7-025902

[51] Int. Cl.$^6$ .................................................. G06F 17/30
[52] U.S. Cl. .............................................................. 360/48
[58] Field of Search ............................ 360/48; 395/621, 395/622, 763; 707/205, 206

[56] References Cited

U.S. PATENT DOCUMENTS

| | | | |
|---|---|---|---|
| 5,274,508 | 12/1993 | Tan et al. | 360/48 |
| 5,321,562 | 6/1994 | Hamada et al. | 360/48 |
| 5,428,727 | 6/1995 | Kurosu et al. | 395/763 |
| 5,608,858 | 3/1997 | Kurosu et al. | 395/763 |

*Primary Examiner*—Thomas G. Black
*Assistant Examiner*—Ruay Lian Ho
*Attorney, Agent, or Firm*—Frommer Lawrence & Haug LLP; William S. Frommer

[57] ABSTRACT

A data recorder performs tape loading and unloading operations at high speed and without requiring the tape to be rewound to its top portion upon unloading. The data recorder records updated header information on the tape when the unloading operation is performed. The header information may contain unique values for identifying the tape and its volume. The header information including the values may be stored to a database or other memory device. The data recorder changes the position of a header information on the tape whenever the header information is updated to prevent a damage to a particular portion of the tape. Following the header information, also recorded is unload information that represents the position of the updated header information on the tape.

31 Claims, 28 Drawing Sheets

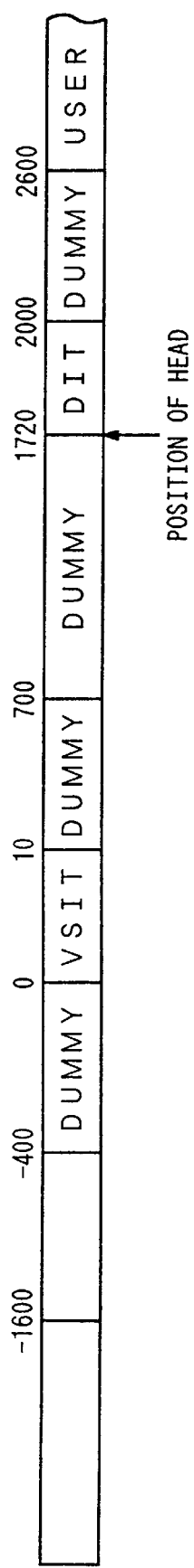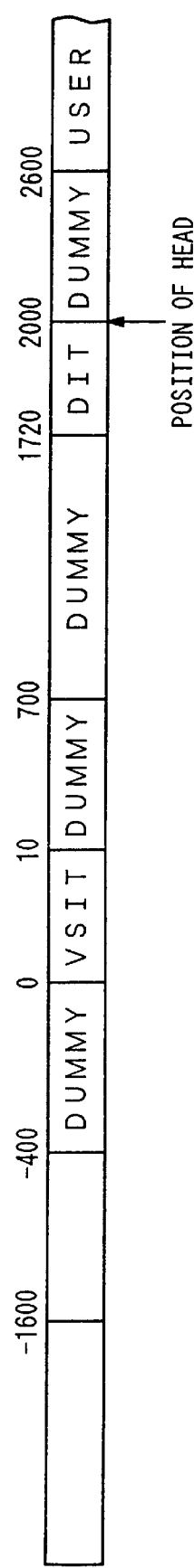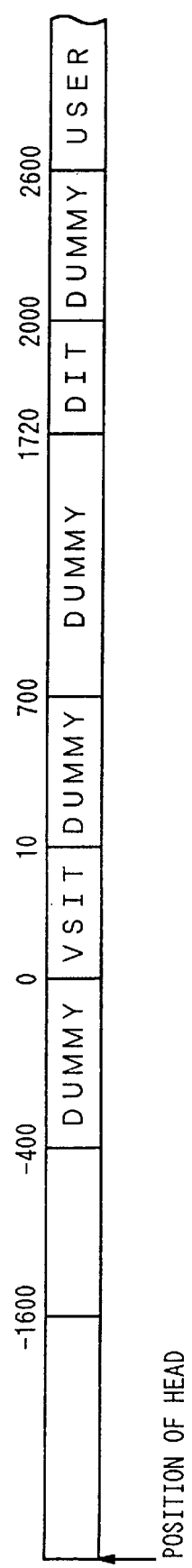

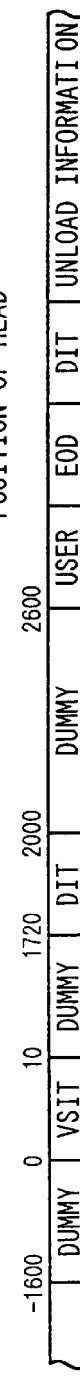
Fig. 16A
Fig. 16B
Fig. 16C
Fig. 16D
Fig. 16E
Fig. 16F
Fig. 16G

Fig. 19

CONTENTS OF UNLOAD INFORMATION

| WORD BYTE | (MSB) BYTE3 | BYTE2 | BYTE1 | (LSB) BYTE0 |
|---|---|---|---|---|
| 0~43 | RESERVED ( = 00000000) | | | |
| 44 | TOP ID OF TAPE ( = 000006B8) | | | |
| 45 | PHISICAL ID OF LAST DATA BLOCK OF TAPE ( = L CASSETTE : 00058B88 / S CASSETTE : 0001BAF8 ) | | | |
| 46~61 | RESERVED ( = 00000000) | | | |
| 62 | LOGICAL VOLUME COUNT OF TAPE ( = MAX. 1024) | | | |
| 63 | RESERVED ( = 00000000) | | | |
| 64 | TOP PHISICAL ID OF VOLUME #1 | | | |
| 65 | LAST PHISICAL ID OF VOLUME #1 | | | |
| ※ 66 | PHISICAL ID OF VALID DIT OF VOLUME #1 | | | |
| 67 | RESERVED ( = 00000000) | | | |
| 68 | TOP PHISICAL ID OF VOLUME #2 | | | |
| 69 | LAST PHISICAL ID OF VOLUME #2 | | | |
| ※ 70 | PHISICAL ID OF VALID DIT OF VOLUME #2 | | | |
| 71 | RESERVED ( = 00000000) | | | |
| 4156 | TOP PHISICAL ID OF VOLUME #1024 | | | |
| 4157 | LAST PHISICAL ID OF VOLUME #1024 | | | |
| ※4158 | PHISICAL ID OF VALID DIT OF VOLUME #1024 | | | |
| 4159 | RESERVED ( = 00000000) | | | |
| 4160 | RANDOM NUMBER UPON GENERATION OF VSIT | | | |
| 4161 | OVERWRITE COUNTER OF TAPE (INCREMENTED BY 1 WHENEVER VOLUME IS ERASED | | | |
| 4162~ | RESERVED ( = 00000000) | | | |
| ~29216 | RESERVED ( = 00000000) | | | |

Fig. 21

CONTENTS OF SUB-CODE AREA

| WORD BYTE | (MSB) BYTE3 | BYTE2 | BYTE1 | (LSB) BYTE0 |
|---|---|---|---|---|
| 0 | ID | | | |
| 1 | A | LOGICAL ID | | |
| 2 | FILE NO. | | | |
| 3 | C | VALID BLOCK TABLE COUNT | | |
| 4 | INITIAL NO. | | | |
| 5 | OVERWRITE COUNTER | | | |
| 6 | W | WRITE RETRY COUNT | | |
| 7 | DRIVE SERIAL NO. | | | |
| 8 | ROM VERSION | | | |
| 9~13 | LOGICAL VOLUME NO. | | | |
| 14 | TAPE INITIAL NO. | | | |
| 15 | TAPE OVERWRITE COUNTER | | | |
| 16 | LIDT AVAILABLE FLAG | | | |
| 17 | BLOCK OPERATION TYPE | | | |
| 18 | FORMAT TYPE | | | |
| 19 | CREATE TIME | | | |
| 20 | MOUNT NUMBER | | | |
| 21 | NUMBER OF READ RETRIES | | | |
| 22 | TOTAL NUMBER OF RECOVERIES | | | |
| 23 | RECOVERY FAILURE FLAG | | | |
| 24~33 | RESERVED | | | |

*Fig. 22*

CONTENTS OF BLOCK MANAGEMENT TABLE

| WORD / BYTE | (MSB) BYTE3 | BYTE2 | BYTE1 | (LSB) BYTE0 |
|---|---|---|---|---|
| 0 ~ 3 | ABSOLUTE BLOCK NO. OF DATA MANAGED BY TABLE | | | |
| | TOP ADDRESS OF DATA AREA OF DATA MANAGED BY TABLE | | | |
| | L | S | NUMBER OF BYTES OF VALID DATA OF DATA MANAGED BY TABLE | |
| | TOTAL NUMBER OF BYTES OF BLOCK | | | |

Fig. 23

CONTENTS OF VIT

| WORD BYTE | (MSB) BYTE3 | BYTE2 | BYTE1 | (LSB) BYTE0 |
|---|---|---|---|---|
| 0~3 | RESERVED ( = 00000000)) | | | |
| 4~43 | VOLUME LABEL | | | |
| 44 | TOP PHISICAL ID OF DATA BLOCK ( = TOP ID OF USER AREA) | | | |
| 45 | LAST PHISICAL ID OF DATA BLOCK ( = POSITION OF EOD) | | | |
| 46 | LAST ABN OF DATA BLOCK ( = ABN CORRESPONDING TO EOD) | | | |
| 47~64 | RESERVED ( = 00000000)) | | | |
| 65 | UIT AVAILABLE FLAG ( ALL "0s" OR "1s") | | | |
| 66~254 | RESERVED ( = 00000000)) | | | |
| 255 | VOLUME NO. UPON INITIALIZATION | | | |
| 256 | OVERWRITE COUNTER | | | |
| 257 | LIDT AVAILABLE FLAG ( = ffffffff) | | | |
| 258 | BLOCK OPERATION TYPE ( = ffffffff) | | | |
| 259 | FORMAT TYPE ( = 00000001) | | | |
| 260 | ECC TYPE ( = 00000002) | | | |
| 261 | VOLUME CREATION TIME ( = 00000000) | | | |
| 4096 | UIT TYPE ( = 00000001) | | | |
| 8192~8215 | MOUNT INFORMATION | | | |
| 16384 | TOTAL NUMBER OF TIMES OF READ RETRY | | | |
| 16385 | TOTAL NUMBER OF TIMES OF RECOVERY | | | |
| 16386 | RECOVERY FAILURE FLAG ( = 00000000) | | | |

Fig. 24

CONTENTS OF LIDT

| BYTE \ WORD | (MSB) BYTE3 | BYTE2 | BYTE1 | (LSB) BYTE0 |
|---|---|---|---|---|
| 0~3 | ADDRESS OF LOGICAL ID | | | |
| | ADDRESS OF PHISICAL ID | | | |
| | FILE NO. | | | |
| | ABSOLUTE BLOCK NO. | | | |

Fig. 25

CONTENTS OF FIT

| BYTE \ WORD | (MSB) BYTE3 | BYTE2 | BYTE1 | (LSB) BYTE0 |
|---|---|---|---|---|
| 0~1 | ADDRESS OF PHISICAL ID OF TAPE MARK #1 | | | |
| | ABSOLUTE BLOCK NO. OF TAPE MARK #1 | | | |
| 3 | RESERVED ( = 00000000) | | | |
| 4~5 | ADDRESS OF PHISICAL ID OF TAPE MARK #2 | | | |
| | ABSOLUTE BLOCK NO. OF TAPE MARK #2 | | | |
| 6 | RESERVED ( = 00000000) | | | |
| ⁓ | ⁓ | | | ⁓ |
| P,Q | ADDRESS OF PHISICAL ID OF TAPE MARK #N | | | |
| | ABSOLUTE BLOCK NO. OF TAPE MARK #N | | | |
| ⁓ | ⁓ | | | ⁓ |
| Z | RESERVED ( = 00000000) | | | |

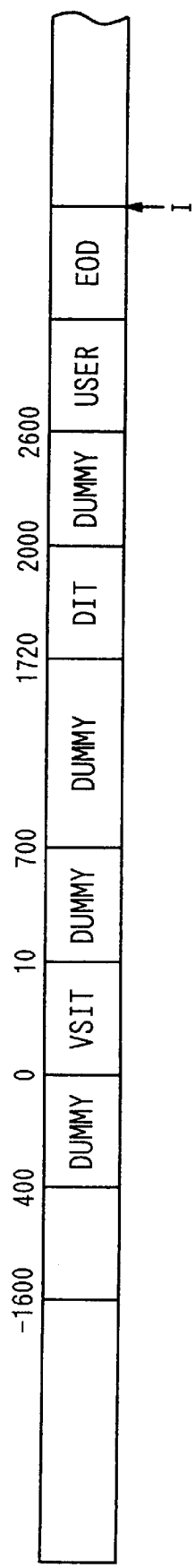
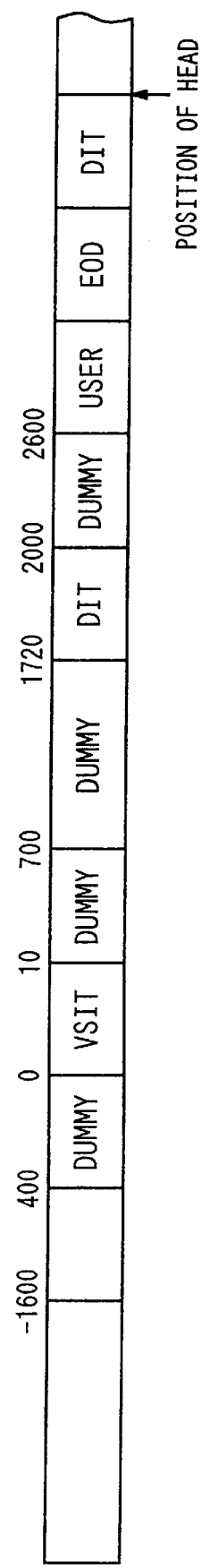
Fig. 29A
Fig. 29B
Fig. 29C

Fig. 30

| TAPE INITIAL NO. | VOLUME INITIAL NO. | DIT-ID | DUMMY |
|---|---|---|---|
| 12345678 | 2345671A | 3500 | |
| 58693021 | ABCD2346 | 12346 | |
| 12940656 | AABB3940 | 6900 | |
| ------ | ------ | ------ | |

DATA RECORDER

BACKGROUND OF THE INVENTION

1. Field of the Invention

The present invention relates to a data recorder for use with for example a helical scan type data recorder for recording digital data as helical tracks with a rotating head.

2. Description of the Related Art

Magnetic tape drive units that are external storage units for use with computers are known. As an example of the magnetic tape drive units, a helical scan type unit for recording digital data on a cassette tape with a rotating head is known. In such a magnetic tape drive unit, as a process for starting writing/reading data to/from the tape (hereinafter referred to as loading process), header information recorded at a predetermined position of the tape is read and stored in a memory of the unit. In addition, as a process for stopping reading/writing data from/to the tape (referred to as unloading process), the header information stored in the memory of the unit is recorded at a predetermined position of the tape. Thereafter, the tape is removed from the unit.

Conventionally, when the unloading process is performed and the tape is removed from the unit, to prevent the tape from being damaged, the tape should be rewound to the tape top position. In other words, the tape should be removed after the tape is rewound to the tape top position.

Thus, the unloading process takes a long time because of rewinding of the tape. Particularly, since the tape has a large amount of data, it takes a long time to rewind the tape from the read/write position to the tape top position. Conventionally, a DIT (Directory Information Table) that is header information is disposed at a fixed position on the tape. Whenever the loading process or the unloading process is performed, the DIT data is updated. Thus, the head always accesses the DIT area. Consequently, only the DIT area is largely damaged.

OBJECTS AND SUMMARY OF THE INVENTION

Therefore, an object of the present invention is to provide a data recorder that can perform the unloading process at a high speed without need to rewind the tape to the tape top position.

Another object of the present invention is to provide a data recorder that can perform the loading process at a high speed.

A further object of the present invention is to provide a data recorder that can change the position of header information on the tape whenever the header information is updated so as to prevent a particular portion from being largely damaged.

A first aspect of the present invention is a data recorder for writing updated header information on a recording medium upon unloading of a recording medium and writing unload information including information that represents the position of the header information on the recording medium after the header information.

A second aspect of the present invention is a data recorder for writing updated header information including unique values of a tape and a volume upon unloading of a recording medium and registering the unique values of the header information and the write position of the updated header information to a database of a memory.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 14A to 14C are schematic diagrams for explaining an unloading process of the data recorder according to the present invention;

FIGS. 16A to 16G are schematic diagrams for explaining the loading process according to the first embodiment of the present invention;

FIG. 19 is a schematic diagram showing the contents of unload information according to the first embodiment of the present invention;

FIG. 21 is a schematic diagram showing the contents of a sub-code area of the DIT;

FIG. 22 is a schematic diagram showing the contents of a block management table of the DIT;

FIG. 23 is a schematic diagram showing the contents of a VIT in the DIT;

FIG. 24 is a schematic diagram showing the contents of an LIDT in the DIT;

FIG. 25 is a schematic diagram showing the contents of an FIT in the DIT;

FIGS. 29A to 29C are schematic diagrams for explaining the unloading process according to the second embodiment of the present invention; and FIG. 30 is a schematic diagram for explaining a database according to the second embodiment of the present invention.

DETAILED DESCRIPTION OF THE PREFERRED EMBODIMENTS

Figure 1:
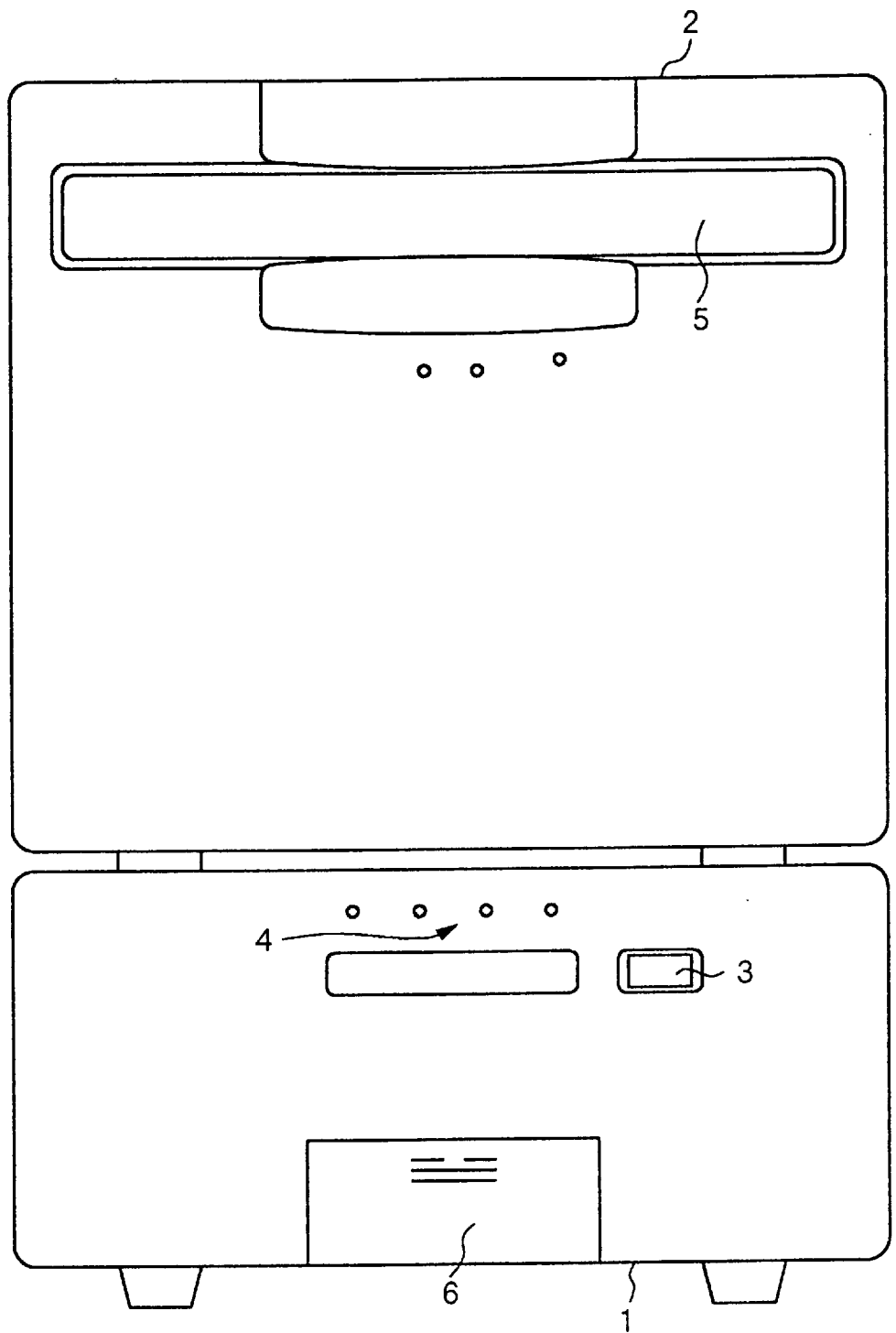
FIG. 1 is an outlined front view showing a data recorder according to the present invention.
Figure 2:
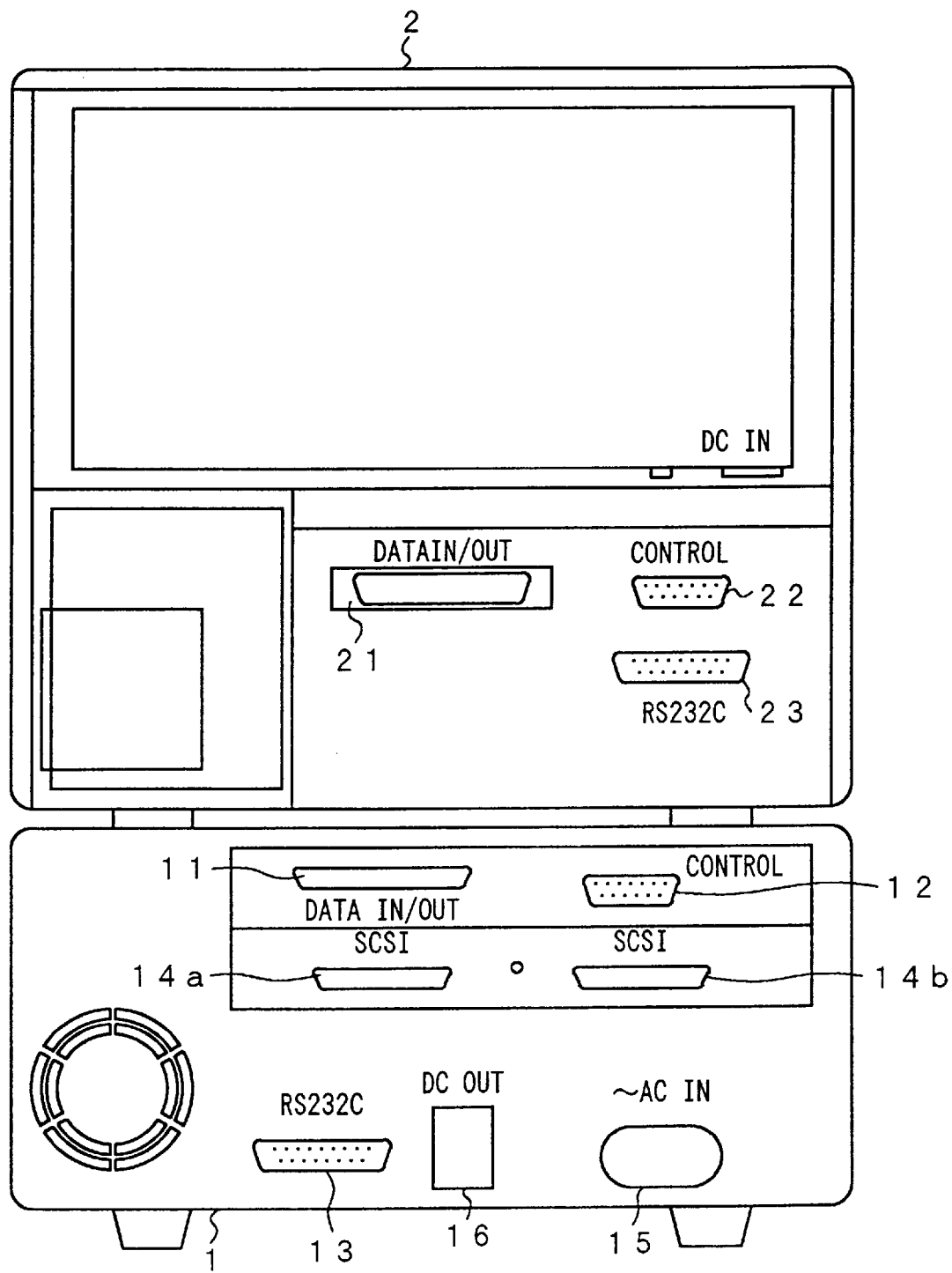
FIG. 2 is an outlined rear view showing the data recorder according to the present invention.

Before explaining embodiments of the present invention, a data recorder according to the present invention will be described. The data recorder records/reproduces digital data to/from a cassette tape with a rotating head. FIG. 1 is a front view showing the data recorder. FIG. 2 is a rear view of the data recorder.

As shown in FIGS. 1 and 2, the data recorder is composed of two units that are an upper unit and a lower unit. The lower unit is literally disposed below the upper unit. The lower unit is a tape drive controller 1. The upper unit is a digital information recorder 2. The tape drive controller 1 has a front panel that includes a button 3 and a plurality of light emitting diodes 4. The button 3 is used to perform the loading/unloading processes for a cassette tape. The light emitting diodes 4 represent whether or not a cassette tape has been loaded, whether or not the power has been turned on, and so forth. The digital information recorder 2 has a front panel with a cassette tape loading/unloading opening 5. In addition, the digital information recorder 2 has a detachable panel 6. Inside the detachable panel 6, other operation buttons are disposed.

As shown in FIG. 2, on the rear panels of the tape drive controller 1 and the digital information recorder 2, a plurality of connectors are disposed. On the rear panel of the lower tape drive controller 1, a data input/output connector 11, a control connector 12, an RS232C connector 13, two SCSI connectors 14 and 14b, an AC power input connector 15, and a DC power output connector 16 are disposed.

On the rear panel of the digital information recorder 2, a data input/output connector 21, a control connector 22, and an RS232C connector 23 are disposed. By connecting a dedicated cable to the DC power output connector 16 of the tape drive controller 1, power is supplied to the digital information recorder 2. The data input/output connectors 11 and 21 are connected with a dedicated cable. Data is sent and received between the controller 1 and the recorder 2. The control connectors 12 and 22 are connected with a dedicated cable. Thus, control signals are exchanged between the controller 1 and the recorder 2. The RS232C connectors 13 and 23 are used for diagnosis purposes.

Figure 3:
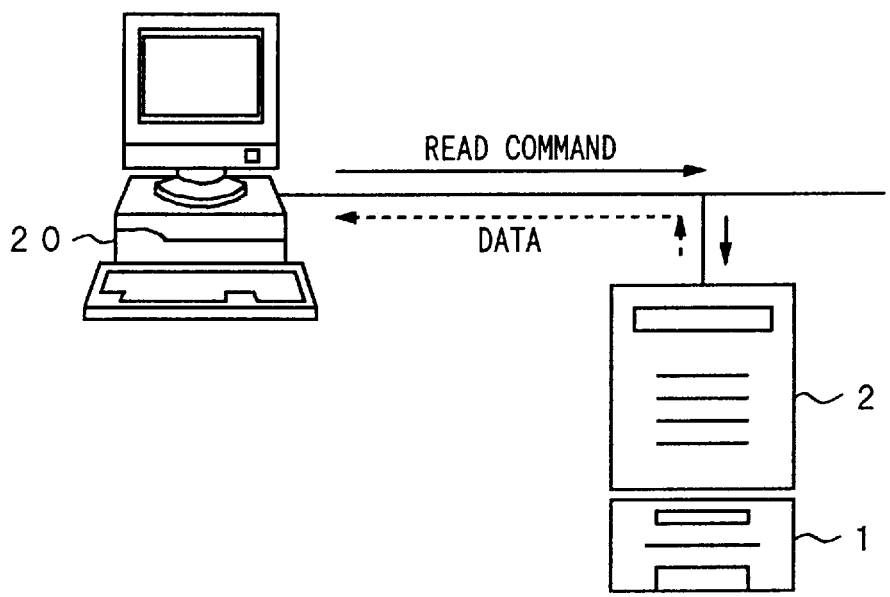
FIG. 3 is a schematic diagram showing an application of the data recorder according to the present invention.

As shown in FIG. 3, when a host computer 20 is connected to the data recorder, the SCSI connectors 14a and 14b are used. When the host computer 20 sends for example a read command to the data recorder, it outputs data to the host computer 20.

Figure 4:
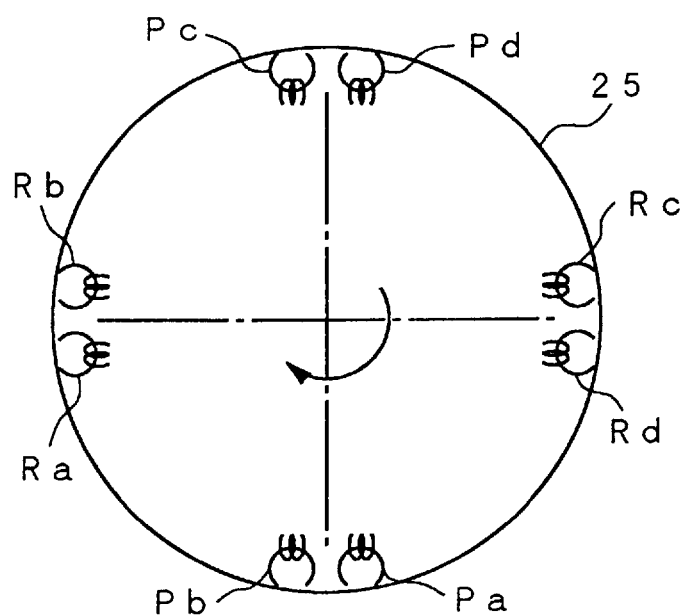
FIG. 4 is a schematic diagram showing the arrangement of heads for use with the data recorder according to the present invention.

The digital information recorder 2 records/reproduces data to/from a cassette tape with rotating heads. (In the following description, the rotating heads may be treated as a single head for convenience.) FIG. 4 shows the arrangement of the heads used in the recorder 2. Four record heads Ra, Rb, Rc, and Rd and four reproduction (playback) heads Pa, Pb, Pc, and Pd are disposed on a drum 25 that rotates at a predetermined speed in the direction shown in FIG. 4.

The heads Ra and Rb are adjacently disposed. This relation applies to pairs of heads Rc and Rd, heads Pa and Pb, and heads Pc and Pd. The extended directions of each pair of heads are different from each other. The extended directions are referred to as azimuths. Referring to FIG. 4, the heads Ra and Rc are disposed at an interval of 180° and have a first azimuth. The heads Rb and Rd are disposed at an interval of 180° and have a second azimuth. The heads Pa and Pc have the first azimuth. The heads Pb and Pd have the second azimuth. With the different azimuths, cross talks can be prevented between adjacent tracks. Each of the adjacent heads is integrally composed as one head. The integrally composed head is referred to as a double-azimuth head.

A tape (for example, ½ inch wide) that is led out of the cassette is helically wound around the periphery of the drum 25 for an angle range of 180° or greater. The tape is supplied at a predetermined speed. Thus, when a signal is recorded to the tape, in the first half period of one rotation of the drum 25, the heads Ra and Rb scan the tape. In the second half period, the heads Rc and Rd scan the tape. When a signal is reproduced from the tape, in the first period, the heads Pa and Pb scan the tape. In the second period, the heads Pc and Pd scan the tape.

Figure 5:
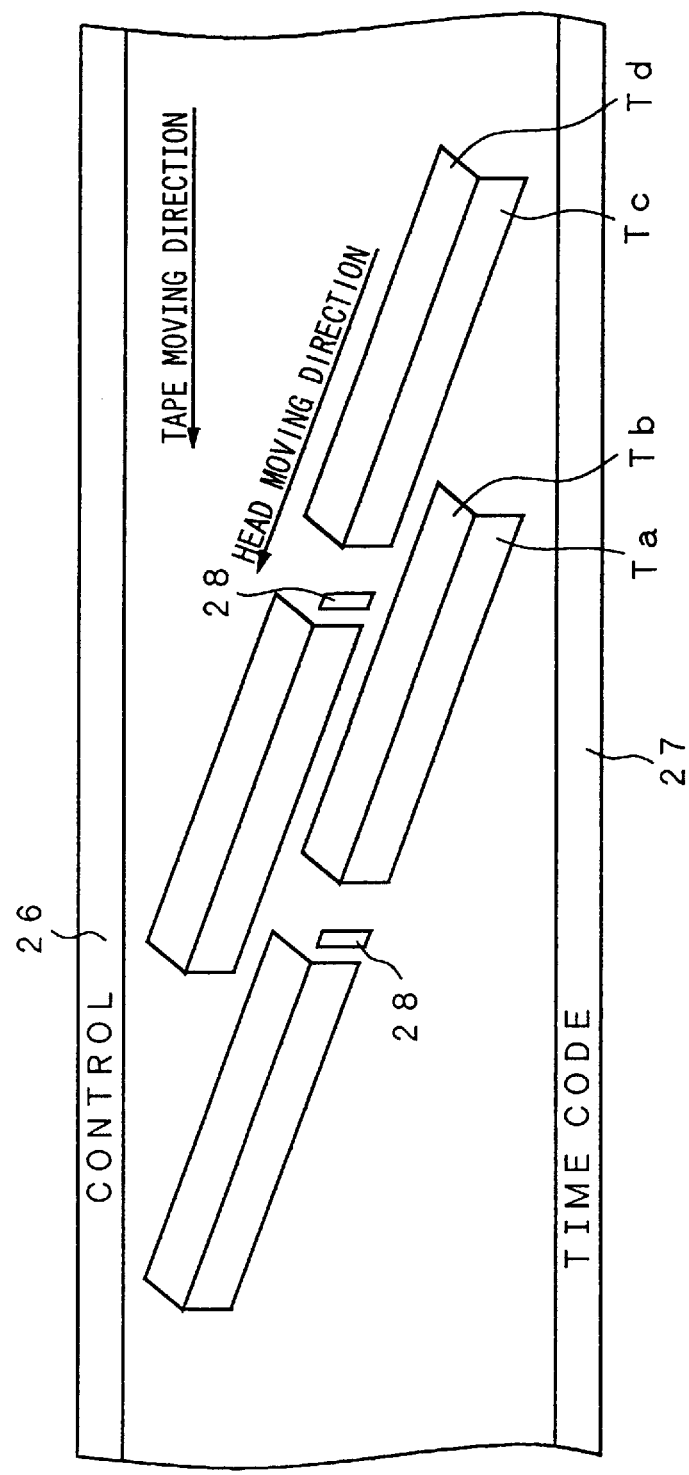
FIG. 5 is a schematic diagram showing a track pattern of the data recorder according to the present invention.

FIG. 5 shows a track pattern on the tape of the digital information recorder 2. Longitudinal tracks are disposed in the width direction of the tape. Helical tracks are disposed between the longitudinal tracks. A control signal is recorded on an upper longitudinal track 26. A time code is recorded on a lower longitudinal track 27. The time code represents the position in the longitudinal direction of the tape. For example, the time code is an SMPTE time code. Whenever the drum 25 is rotated, the head Ra and Rb form two helical tracks Ta and Tb at the same time. Thereafter, the heads Rc and Rd form two helical tracks Tc and Td at the same time. On each helical track, a first half portion and a second half portion are separately formed. Between the first half portion and the second half portion of each helical track, a record area 28 is disposed. The record area 28 is used to record a tracking pilot signal.

The SMPTE time code was developed for a video signal for use with a VCR or the like. The minimum unit of the SMPTE time code is a frame (⅟30 second). As will be described later, in the data recorder, data that can be recorded on the four tracks Ta to Td shown in FIG. 5 is defined as a logical data unit (referred to as track set). When 16 tracks accord with one frame of a video signal, a sub-digit (values 0, 1, 2, and 3) lower than the digit of the frame of the time code is defined. This time code is also referred as ID.

In the data recorder according to the present invention, the SMPTE time code is composed of four tracks as a track set. Since the SMPTE time code has a user data area, such a modification can be performed.

Figure 6:
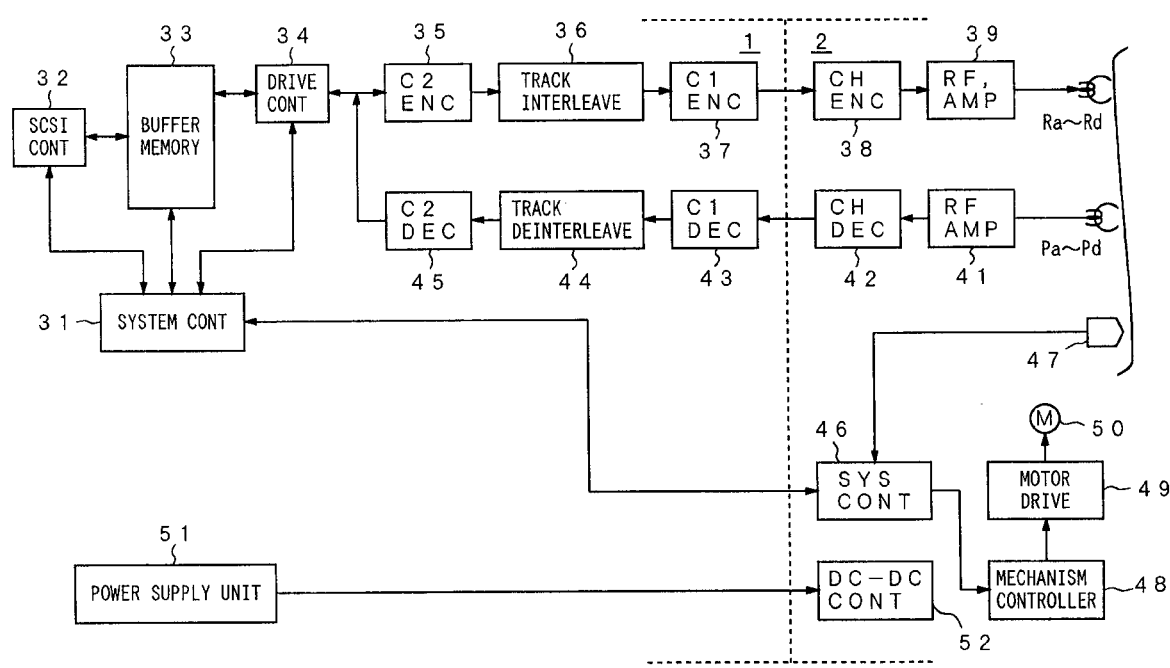
FIG. 6 is a block diagram showing a system structure of the data recorder according to the present invention.

FIG. 6 is an outlined block diagram showing a system structure of the tape drive controller 1 and the digital information recorder 2. The controller 1 has a system controller 31. The system controller 31 has the following functions.

Managing a SCSI controller 32,

Managing a buffer memory 33,

Managing files/tables,
Writing/reading data and controlling retries,
Controlling the digital information recorder 2, and performing self diagnosis.

The system controller 31 is connected to the host computer through the SCSI controller 32. A drive controller 34 is disposed between the buffer memory 33 and the tape drive controller 1. Data that is read from the buffer memory 33 is supplied to a C2 encoder 35 through the drive controller 34. The C2 encoder 35 is connected to a track interleave circuit 36 and a C1 encoder 37.

The C2 encoder 35 and the C1 encoder 37 perform an error correction encoding process for record data with a product code. The track interleave circuit 36 controls the distribution of data to tracks so as to improve the error correction performance in the recording/reproducing processes.

When data is recorded on the tape, it is recorded as SYNC blocks separated by a synchronous signal. In this case, the track interleave circuit 36 adds a block synchronous signal to the output signal of the C2 encoder 35. The C1 encoder 37 generates a C1 parity. Thereafter, data is randomized and words are interleaved in a plurality of SYNC blocks.

Digital data that is output from the C1 encoder 37 is supplied to the digital information recorder 2. The digital information recorder 2 encodes digital data received from a channel code encoder 38 to a signal suitable for the recording/reproducing processes. The resultant record data is output to the record heads Ra to Rd through an RF amplifier 39. The heads Ra to Rd record the record data on the tape. The RF amplifier 39 performs a process corresponding to partial response class 4 (PR (1, 0, −1) so as to lower the frequency band of the record signal and easily detect a reproduction signal.

Data reproduced from the tape by the reproduction heads Pa to Pd is supplied to a channel code decoder 42 through an RF amplifier 41. The RF amplifier 41 includes a reproducing amplifier, an equalizer, and a Viterbi decoder. The output data of the channel code decoder 42 is supplied to the tape drive controller 1. The output data of the channel code decoder 42 is supplied to a C1 decoder 43.

The C1 decoder 43 is connected to a track deinterleave circuit 44. The track deinterleave circuit 44 is connected to a C2 decoder 45. The C1 decoder 43, the track deinterleave circuit 44, and the C2 decoder 45 perform the reverse processes of the C1 encoder 37, the track interleave circuit 36, and the C2 encoder 35, respectively. The reproduction (read) data received from the C2 decoder 45 is supplied to the buffer memory 33 through the drive controller 34.

The digital information recorder 2 has a system controller 46. In addition, the digital information recorder 2 has a fixed head 47 for the longitudinal tracks on the tape. The head 47 is connected to the system controller 46. The head 47 records/reproduces a control signal and a time code. The system controller 46 is connected to the system controller 31 of the tape drive controller 1 through a bidirectional bus.

A mechanism controller 48 is connected to the system controller 46. The mechanism controller 48 includes a servo circuit that drives a motor 50 through a motor drive circuit 49. The system controller 46 has for example two CPUs. The system controller 46 communicates with the tape drive controller 1, controls recording/reproducing of a time code, controls recording/reproducing timings, and so forth using the CPUs.

The mechanism controller 48 has for example two CPUs. The mechanism controller 48 controls a mechanical system of the digital information recorder 2 with the CPUs. In particular, the mechanical controller 48 controls the rotation of the head and tape system, the tape speed, the tracking operation, loading/unloading processes of the cassette tape, and the tape tension. The motor 50 includes a drum motor, a capstan motor, a reel motor, a cassette mounting motor, a loading motor, and so forth.

The digital information recorder 2 has a DC-DC converting circuit 52 that receives a DC voltage from a power supply unit 51 of the tape drive controller 1. The digital information recorder 2 also has position sensors (such as a tape end detecting sensor), a time code generating/reading circuit, and so forth (that are not shown).

Next, the record format of digital data will be described.

Figure 7:
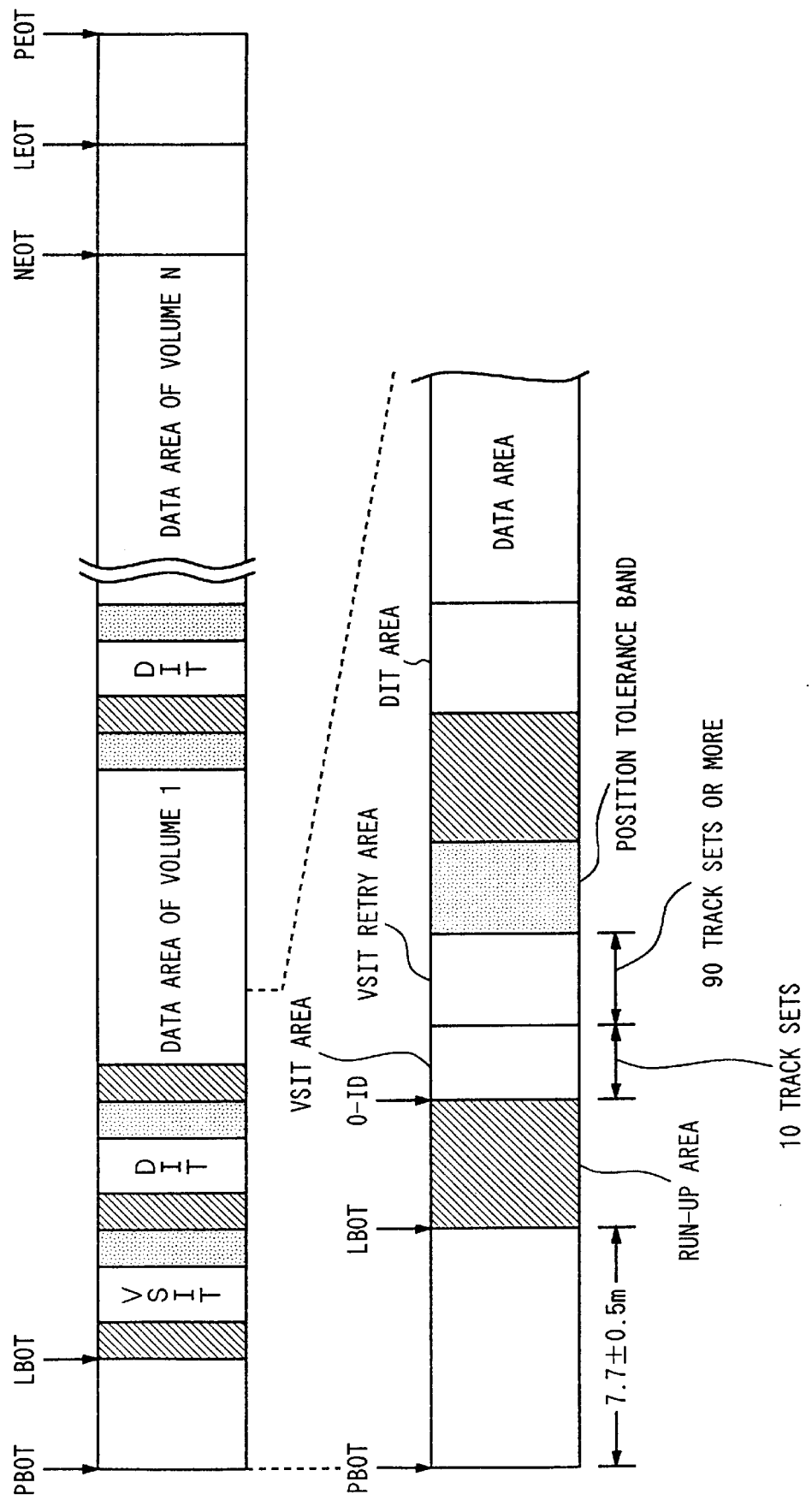
FIG. 7 is a schematic diagram showing a tape format of the data recorder according to the present invention.

FIG. 7 shows the layout of the entire tape (in a cassette, for example). The entire tape is referred to as physical volume. The tape has a leader tape. Between the PBOT (Physical Beginning of Tape) and the PEOT (Physical End of Tape) of a physical tape, a recordable area is between the LBOT (Logical Beginning of Tape) and the LEOT (Logical End of Tape). The recordable area is defined because the tape tends to be damaged at the beginning and end of the tape and thereby the error rates thereof are high. For example, the invalid area between the PBOT and the LBOT is defined 7.7±0.5 m. In addition, the invalid area between the PEOT and LEOT is defined 10 m or greater.

One physical volume has a plurality of logical volumes (referred to as partitions).

To manage one or more logical volumes, a VSIT (Volume Set Information Table) is recorded at the beginning of the record area. The VSIT includes the number of volumes recorded on the tape and position information of the logical volumes on the tape. The position information includes start physical IDs and end physical IDs of DITs (Directory Information Tables) of up to 1024 logical volumes.

The position at the beginning of the VSIT is defined as the position of 0-ID. An ID (Identification) is an address corresponding to the position of every set of four tracks on the tape. IDs are simply incrementally assigned from the VSIT area to the DIT area of the last volume. The length of one VSIT is 1-ID.

The data recorder according to the present invention has two types of IDs that are physical IDs and logical IDs. A physical ID is position information that represents the absolute position of a track set on the tape. The physical ID is equivalent to the time code recorded in the longitudinal direction of the tape. A logical ID is position information that represents the relative position of a track set on the tape. The logical ID is recorded at a predetermined position of a track set. Each of the physical ID and the logical ID of the position 0-ID at the beginning of the VSIT is zero.

A logical volume is composed of a DIT (Directory Information Table), an UIT (User Information Table), and a user data area. The DIT has information for managing a file in the logical volume. The length of one DIT is 40-IDs. The UIT is optional. The UIT is user information for managing a file.

In FIG. 7, hatched areas are run-up areas. With run-up areas, data tracks are servo-locked. Dotted areas are position tolerance areas. With the position tolerance areas, when the VSIT and the DIT are updated, valid data can be prevented from being erased.

Figure 8:
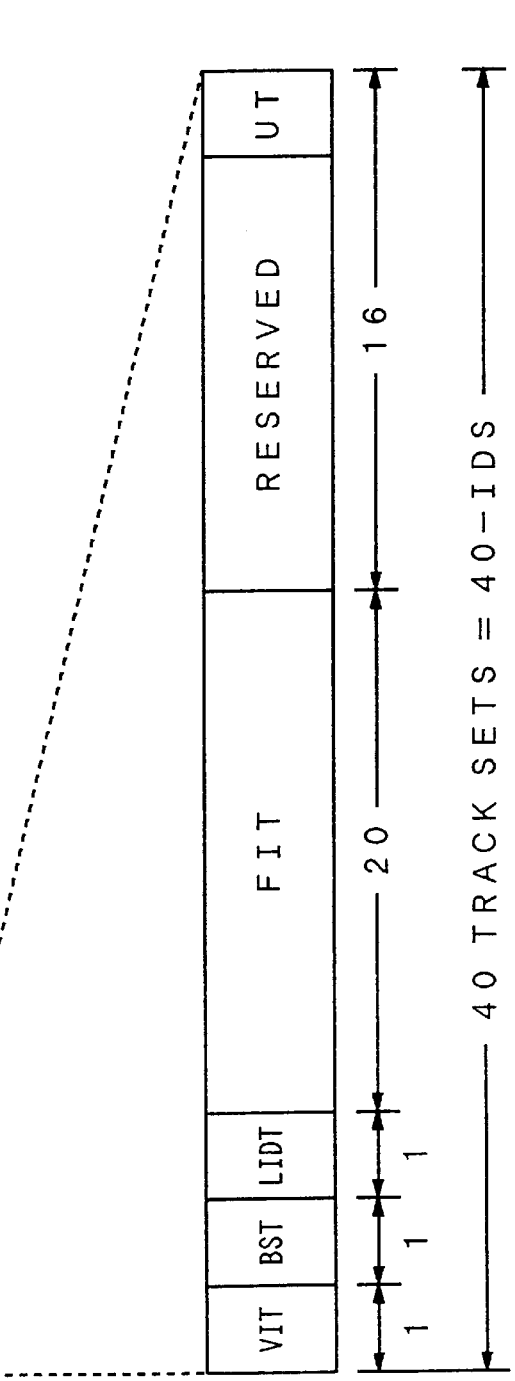
FIGS. 8A, 8B and 8C are schematic diagrams showing formats of a VSIT and a DIT of the data recorder according to the present invention.

As shown in FIG. 8A, the VSIT is repeatedly recorded ten times so as to improve the reliability of data. Thus, the VSIT area is composed of 10 track sets (=10-IDs). The VSIT area is followed by a retry area composed of 90 track sets or more.

As shown in FIG. 8B, the DIT is repeatedly recorded seven times. As shown in FIG. 8C, the DIT is composed of six tables. The six tables are a VIT (Volume Information Table), a BST (Bad Spot Table), an LIDT (Logical Information Table), an FIT (File Information Table), a UT (Update Table), and a UIT (User Information Table) disposed in the order. Each of the VIT, the BST, the LIDT, and the UT has the length of 1-ID. The FIT has the length of 20-IDs. The remaining area for 16-IDs is reserved.

Next, each table of the DIT will be described. The ID address of the VIT is a physical ID at the beginning of volumes written in the VSIT. The logical ID of the VIT is equivalent to the physical ID at the beginning of the volumes written in the VSIT. The VIT includes a volume label and volume information such as a start physical ID of the first data block in the physical volume and the last physical ID thereof. FIG. 23 shows the contents of the VIT.

Figure 9:
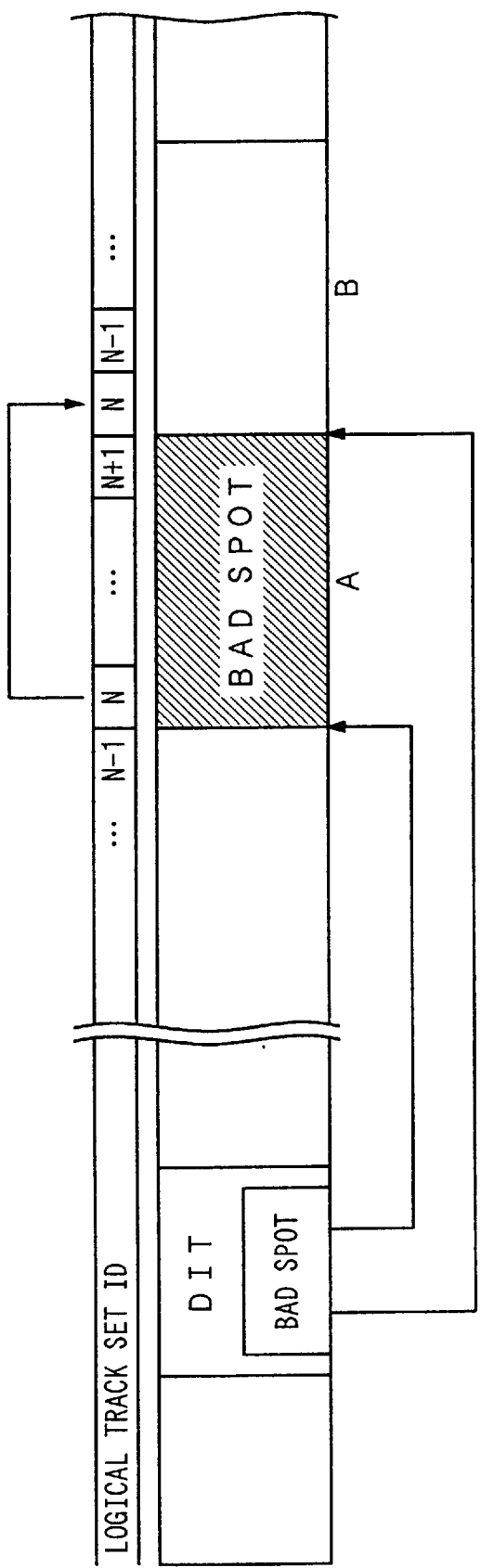
FIG. 9 is a schematic diagram for explaining a BST of the data recorder according to the present invention.

The ID address of the BST is the physical ID of the VIT plus 1, whereas the logical ID thereof is the logical ID of the VIT plus 1. The BST has position information of logically invalid data. The logically invalid data is data that is treated invalid because of presence of the same track set ID. For example, as shown in FIG. 9, a hatched area A is logically invalid data. A write retry operation and a write operation associated therewith cause logically invalid data. When a write operation is performed, if an error takes place, a write retry is automatically performed and an error location thereof is output. The error location is stored in the BST. When a read operation is performed, the BST represents an invalid area. The logically invalid data is also referred to as bad spot. The BST can manage top physical IDs and last physical IDs of up to 14592 bad spots.

The ID address of the LIDT is the physical ID of the VIT plus 2, whereas the logical ID thereof is the logical ID of the VIT plus 2. The LIDT is a data table for a high speed block space and a locating operation. In other words, the LIDT includes logical IDs and physical IDs of pointers 1 to 29, file numbers, and the first block number of the ID data in the block management table. FIG. 24 shows the contents of the LIDT.

The ID address of the FIT is the physical ID of the VIT plus 3, whereas the logical ID thereof is the logical ID of the VIT plus 3. The FIT is composed of a plurality of pairs of two types of data corresponding to tape marks. The tape marks are file delimiter codes. The N-th data pair accords with an N-th tape mark counted from the beginning of the volume. One data of each pair is the physical ID of the N-th tape mark. The other data of the pair is the absolute block number of the tape mark N. This value is the absolute block number of the last block with the same file number as the tape mark. With the physical ID and the absolute block number of the tape mark, the position of the tape mark can be precisely detected. Thus, a desired physical position on the tape can be accessed at a high speed. FIG. 25 shows the contents of the FIT.

The ID address of the UT is the physical ID of the VIT plus 39. The UT is information that represents whether or not a volume has been updated. If a volume has not been updated, a word (four bytes) that represents the update status of the UT is FFFFFFFFh (h represents hexadecimal notation). After a volume has been updated, the word is 00000000h.

The UIT is optional. The UIT is an area of for example 100-IDs. The UIT is a user accessible data table for storing a user header.

Figure 10:
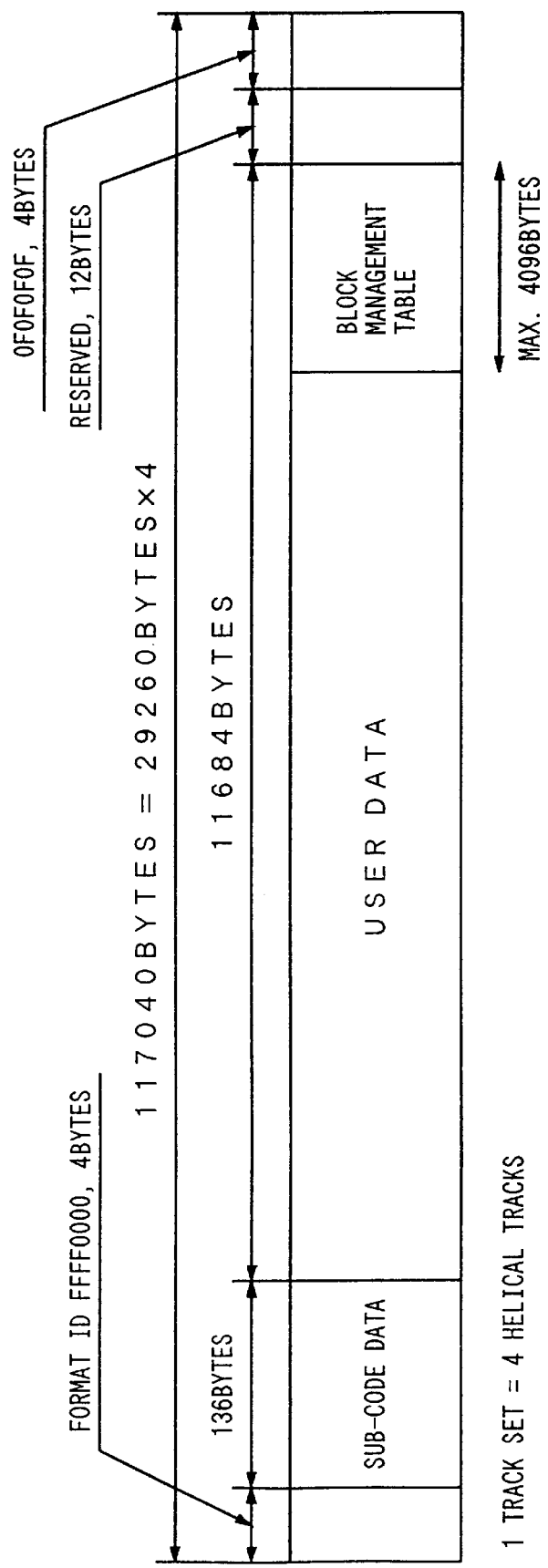
FIG. 10 is a schematic diagram for explaining a logical format of the data recorder according to the present invention.

In this example, 1-ID is assigned to each track set composed of four helical tracks. The logical structure of a data block is defined for each track set. FIG. 10 shows the structure of a logical track set. The first four bytes of the logical track set are used for a format ID that is FFFF0000h.

The next 136 bytes (34 words) are used for an area for sub-code data. The sub-code data is composed of management information of a track set thereof. The sub-code data includes for example the above-described tables (such as VSIT, VIT, and BST) and ID codes (such as user data and tape marks). Thus, data recorded on the track set can be identified.

The bytes of which the length of the block management table is subtracted from the next 116884 bytes are used for a user write area. When the track set is used for a user data write area, if the size of the user data is smaller than the size of the user data write area, dummy data is filled in the rest of the area.

User data is followed by the block management table area. The length of the block management table is up to 4096 bytes. The last four bytes of the track set are used for a last code (0F0F0F0Fh) of the track set. The last code is preceded by a reserved area of 12 bytes. The block management table is used to manage the structure of a data block of user data. FIG. 22 shows the contents of the block management table.

There are four types of track sets defined in the user data area, namely, a user data track set used for writing user data, a tape mark (TM) track set for representing a tape mark, an EOD (End of Data) track set for representing EOD, and a dummy track set for representing dummy data. For each track set type, a sub-code and a block management table are defined.

Figure 11:
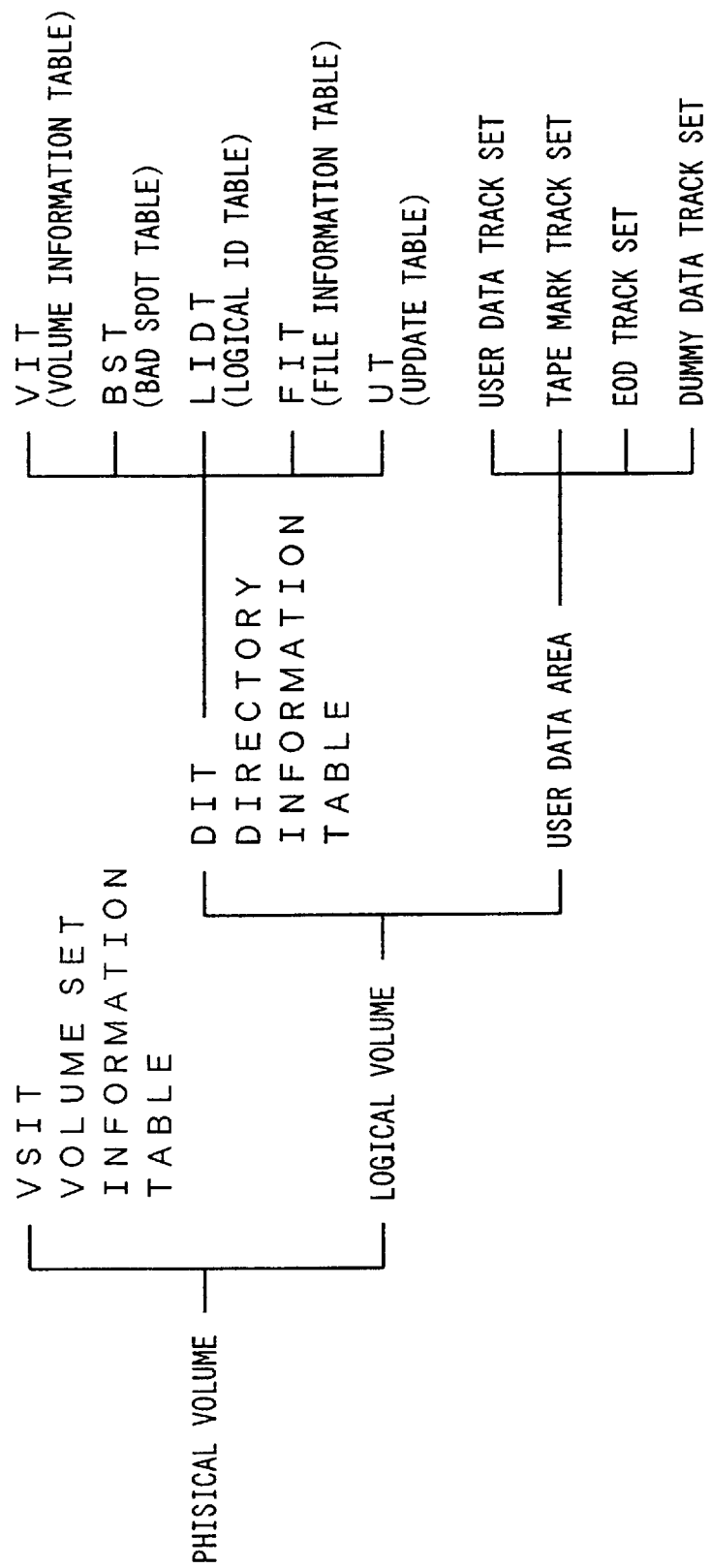
FIG. 11 is a list for explaining a format structure of the data recorder according to the present invention.

FIG. 11 shows the logical formats of the data recorder. The VSIT is recorded for each physical volume such as one volume of tape. A DIT is recorded for each logical volume (partition). The DIT includes five tables that are a VIT, a BST, an LIDT, an FIT, and a UT. In addition, the DIT includes a UIT as optional. The user data area includes four types of track sets that are a user data track set, a tape mark track set, an EOD (End Of Data) track set, and a dummy track set.

Next, the operation of the above-described data recorder will be briefly described. When a tape is used the first time, the tape should be initialized. In the initializing operation of the tape, a VSIT, a DIT, and an EOD are written to predetermined positions of the tape. In addition, dummy data is written to the tape. Moreover, the physical IDs (which are above-described time codes) are written so that they simply increment from the LBOT and the physical ID at beginning of the VSIT is 0-ID.

Before data is written to or read from a tape, the tape is loaded to the data recorder. After the tape is inserted, by pressing the button 3, the loading operation is performed. When the loading operation is performed, a VSIT and a DIT are read from the tape. To stop reading/writing data from/to the tape, by pressing the button 3, the tape is unloaded from the data recorder. When the unloading operation is performed, the VSIT and the DIT are rewritten. The loading operation and the unloading operation can be performed by issuing respective commands instead of the operation of the button 3.

Figure 12:
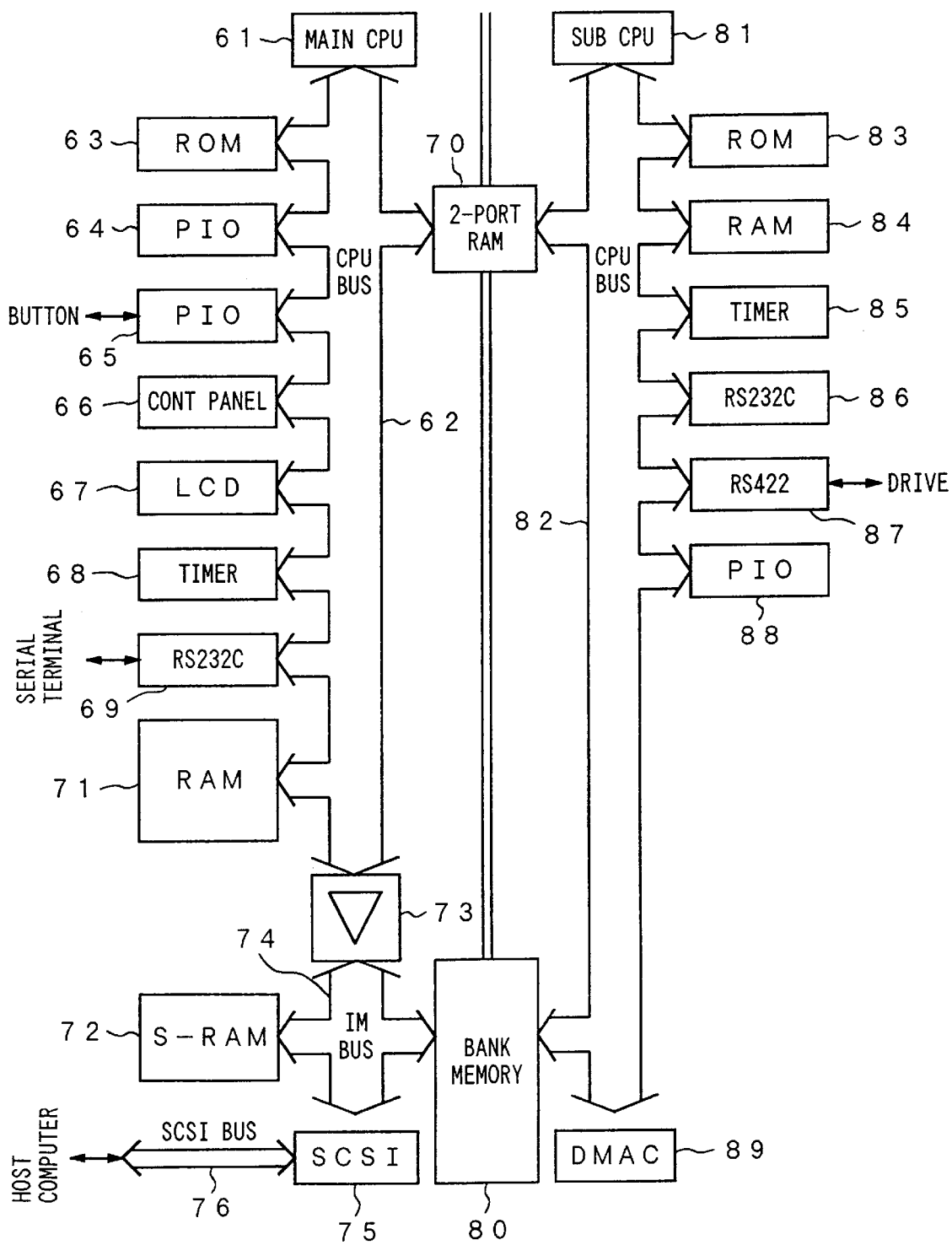
FIG. 12 is a detailed block diagram showing a system structure of the data recorder according to the present invention.

FIG. 12 is a block diagram showing a system structure of the tape drive controller 1. Reference numeral 61 is a main CPU. Reference numeral 70 is a two-port RAM. Reference numeral 80 is a bank memory. Reference numeral 81 is a sub CPU. The main CPU 61 is a CPU that manages the entire system. In association with the main CPU 61, a CPU bus 62 is disposed. Each structural portion of the tape drive controller 1 is connected to the CPU bus 62. In other words, a ROM (flash ROM) 63, PIOs (parallel I/Os) 64 and 65, a control panel 66, an LCD 67, a timer 68, an RS232C interface 69, a two-port RAM 70, and a RAM 71 are connected to the CPU bus 62.

The PIO 65 is connected to a button on the front panel. The LCD 67 is a display unit that displays the operation state of the drive so that the user can know it. The RS232C interface 69 is connected to a serial terminal. The RAM 71 is a work RAM for use with firmware. The RAM 71 has a down-load area of programs and temporarily stores header information (VSIT/DIT).

An IM bus 74 is connected to the CPU bus 62 through a unidirectional controlling device 73. An S-RAM 72, a bank memory 80, and an SCSI controller 75 are connected to the IM bus 74. The host computer is connected to the SCSI controller 75 through a bus 76. The S-RAM 72 is a back-up RAM with a condenser. The S-RAM 72 is used for a script memory (for storing a control program for the SCSI controller). In addition, the S-RAM 72 is used for a logger memory for representing a real operation state of the system. Since this memory is backed up with the condenser, after the power of the system is turned off, the memory can hold data for around two days.

The two-port RAM 70 stores five types of packets for communicating information between the two CPUs 61 and 81. The five types of packets are (1) a command transmission packet that is used when the main CPU 61 requests the sub CPU 81 to perform an operation, (2) an end status reception packet that is used when the end status of the operation of the sub CPU 81 is sent corresponding to a command requested by the main CPU 61, (3) a command status that is a flag representing the progress status of a command, (4) a drive management status table used to inform the main CPU 61 of the status of the drive (this table is rewritten by the sub CPU 81 at predetermined periods), and (5) a data send/receive packet that is a buffer used when the firmware on the drive (recorder) side is down-loaded through the SCSI bus or when a diagnosis on the drive side is activated with the serial port of the main CPU 61. The bank memory 80 is a buffer memory for data.

The sub CPU 81 is a CPU that controls the drive. In association with the sub CPU 81, a CPU bus 82 is disposed. The CPU bus 82 is connected to a ROM (flash ROM) 83, a RAM (work RAM) 84, a timer 85, an RS232C interface 86, an RS422 interface 87, a PIO (Parallel I/O) 88, and a DMA controller 89. In addition, the CPU bus 82 is connected to the two-port RAM 70 and the bank memory 80.

The bank memory 80 stores data that is written to the tape or data that is read from the tape. The bank memory 80 has for example eight memory banks in which write data or read data is stored. The DMA (Direct Memory Access) controller 89 stores data written to the drive to the bank memory 80. The RS232C interface 86 is used for a self diagnosis. The RS422 interface 87 is a communication means with the drive.

The present invention relates to the loading process and the unloading process performed when a tape is loaded and unloaded to/from the data recorder. Before explaining the present invention, with reference to FIGS. 13A through 14C, these processes performed by the above-described data recorder will be described.

Figure 13A:
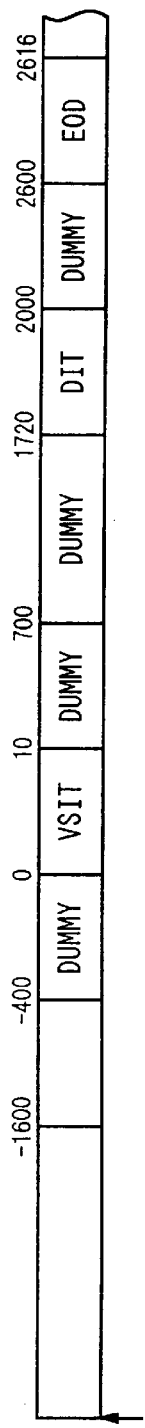
FIGS. 13A to 13F are schematic diagrams for explaining a loading process of the data recorder according to the present invention.

FIGS. 13A to 13F show the loading process (namely, the process for reading a VSIT and a DIT from the tape and storing them to the memory RAM 71). When the SCSI controller 75 receives a load request from the host computer or when the user presses a particular button, the main CPU 61 determines through the PIO 65 that the load request or the operation of the button has been performed. In this case, the main CPU 61 requests the sub CPU 81 to rewind the tape. After the tape is rewound, as shown in FIG. 13A, the head is placed at the top position of the tape.

Figure 13B:
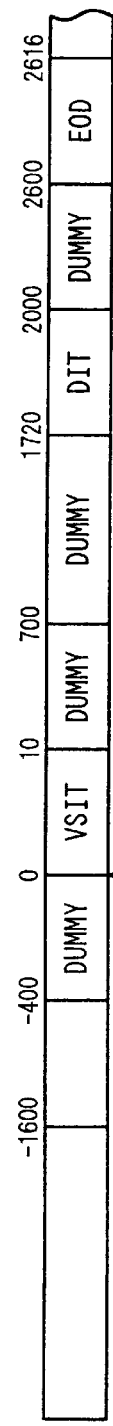
Figure 13C:
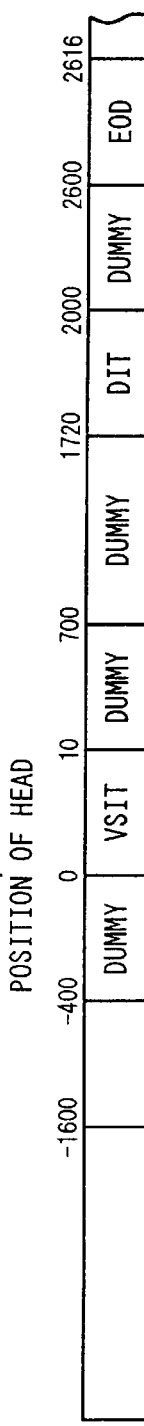

Thereafter, the main CPU 61 determines whether or not the tape is a virgin tape. In this case, the tape is moved from the tape top position for 5600-IDs (equivalent to around 10 meters) at a high speed so that the head is placed at the top edge (0-ID) of the VSIT. At this point, the main CPU 61 determines whether or not a physical ID has been recorded on the tape. When the physical ID has not been recorded, the main CPU 61 determines that the tape is a virgin tape. After the main CPU 61 performs the virgin check, as shown in FIG. 13B, the head is placed at the beginning of the VSIT. Thereafter, the VSIT is read from 0-ID so as to obtain the top position/last position of the first volume. FIG. 13C shows the position of the head when the VSIT is read.

Figure 13D:
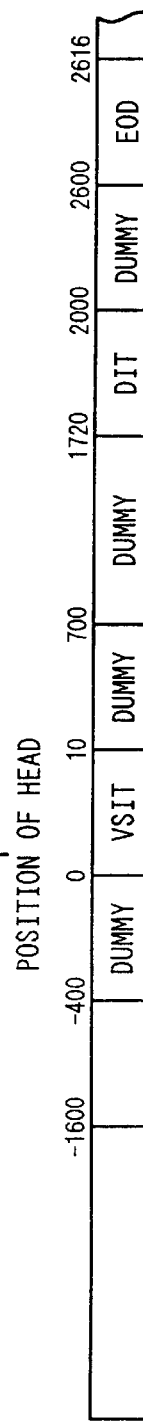

Next, the DIT is read. In other words, as shown in FIG. 13D, DITs are read from 1720-ID for every 40-IDs. The read data is stored in the memory RAM 71. Data of each table of the DIT stored in the memory RAM 71 is always updated under the control of the main CPU 61 corresponding to the operation of the data recorder.

Figure 13E:
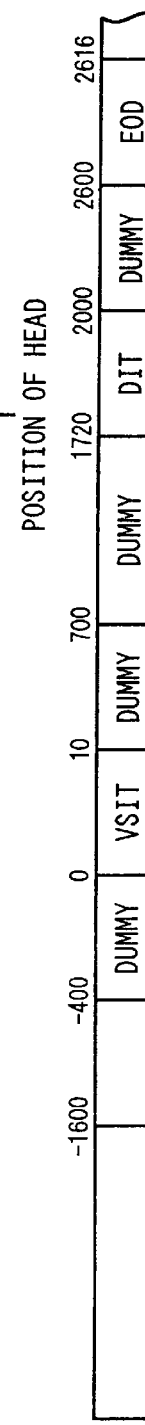
Figure 13F:
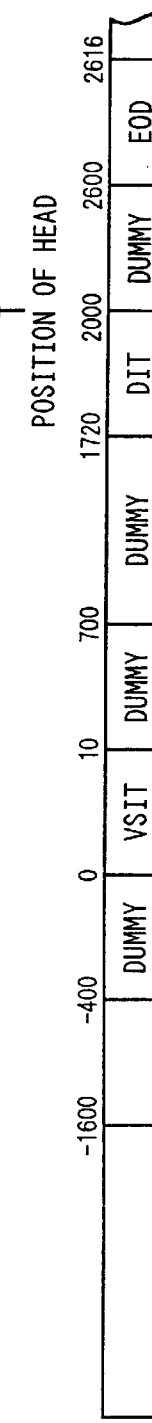

Thereafter, DITs are rewritten in an area from 1720-ID to 19991-ID. In this process, a flag that represents an update status of the UT is set. FIG. 13E shows the position of the head when the DIT is rewritten. Last, as shown in FIG. 13F, the tape is prerolled to the beginning of the user data area. As a result, the loading process is completed.

Next, with reference to FIGS. 14A to 14C, the unloading process (for restoring data stored in the memory RAM 71 to the tape) of the above-described data recorder will be described. When the SCSI controller 75 receives an unload request from the host computer or when the user presses a particular button, the main CPU 61 detects through the PIO 65 that the unload request has been issued or the particular button has been pressed. In this case, the main CPU 61 causes the sub CPU 81 to preroll the tape from the present position to the beginning of a DIT. After the tape has been prerolled, the head is placed at the beginning of the DIT as shown in FIG. 14A.

Thereafter, updated DITs that are stored in the memory RAM 71 are rewritten to the area from 1720-ID to 19991-ID. This process is required for updating the flag of the UT. FIG. 14B shows the position of the head after the DITs have been rewritten.

Thereafter, the tape is rewound. As shown in FIG. 14C, the head is placed at the tape top position. In the state that the head is placed at the tape top position, the eject operation is performed. As a result, the unloading process is completed. Although the eject operation may damage the tape, since it is ejected at the tape top position, the damage can be minimized.

As described above, in the unloading process for the tape, since the tape is rewound to the tape top position, it takes a long time for the unloading process. In the next loading process, to move the tape from the tape top position to a desired DIT position, it takes a long time. In addition, since fixed DIT areas on the tape are rewritten whenever the loading/unloading processes are performed, the DIT areas tend to be damaged.

Figure 15:
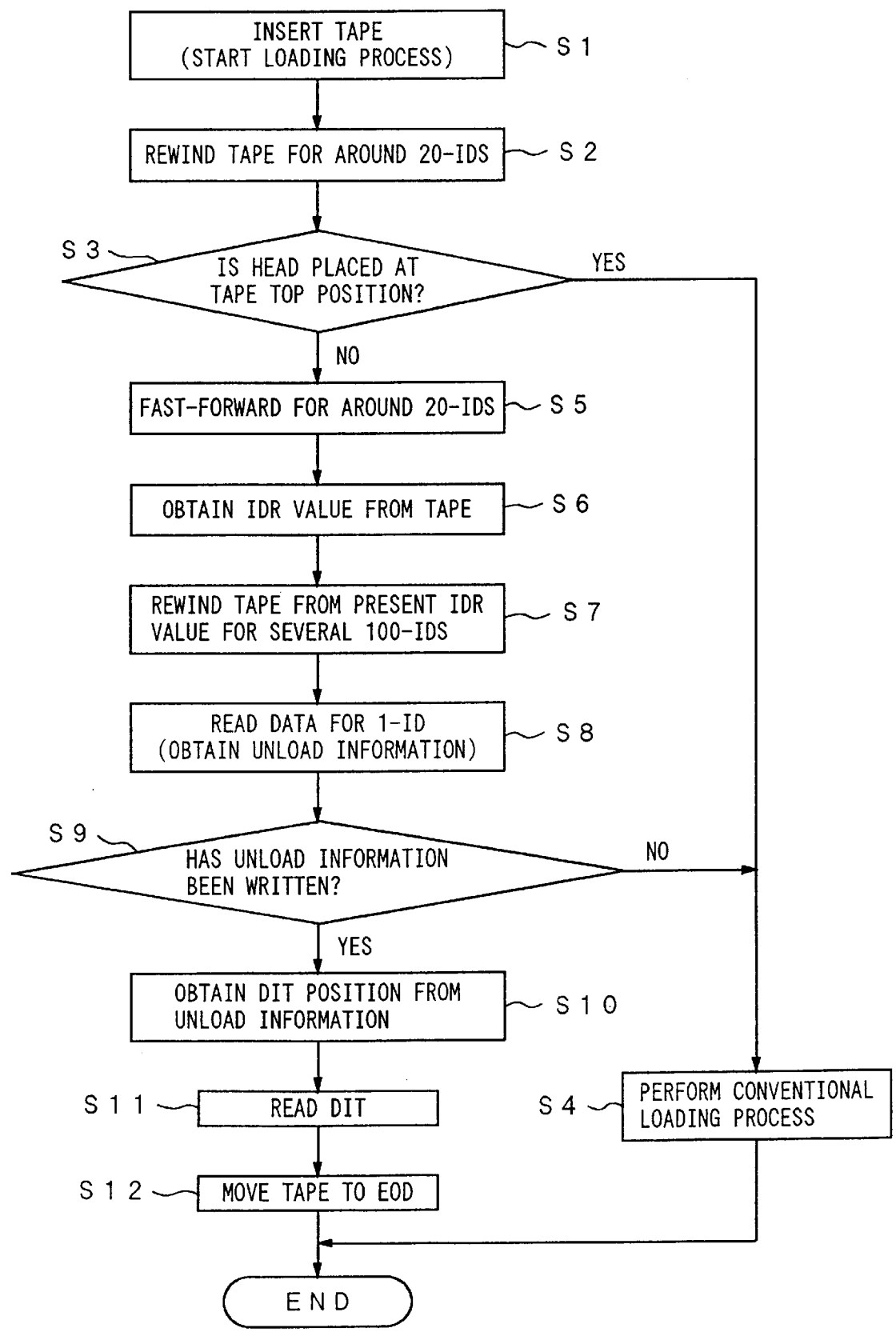
FIG. 15 is a flow chart for explaining the loading process according to a first embodiment of the present invention.
Figure 17:
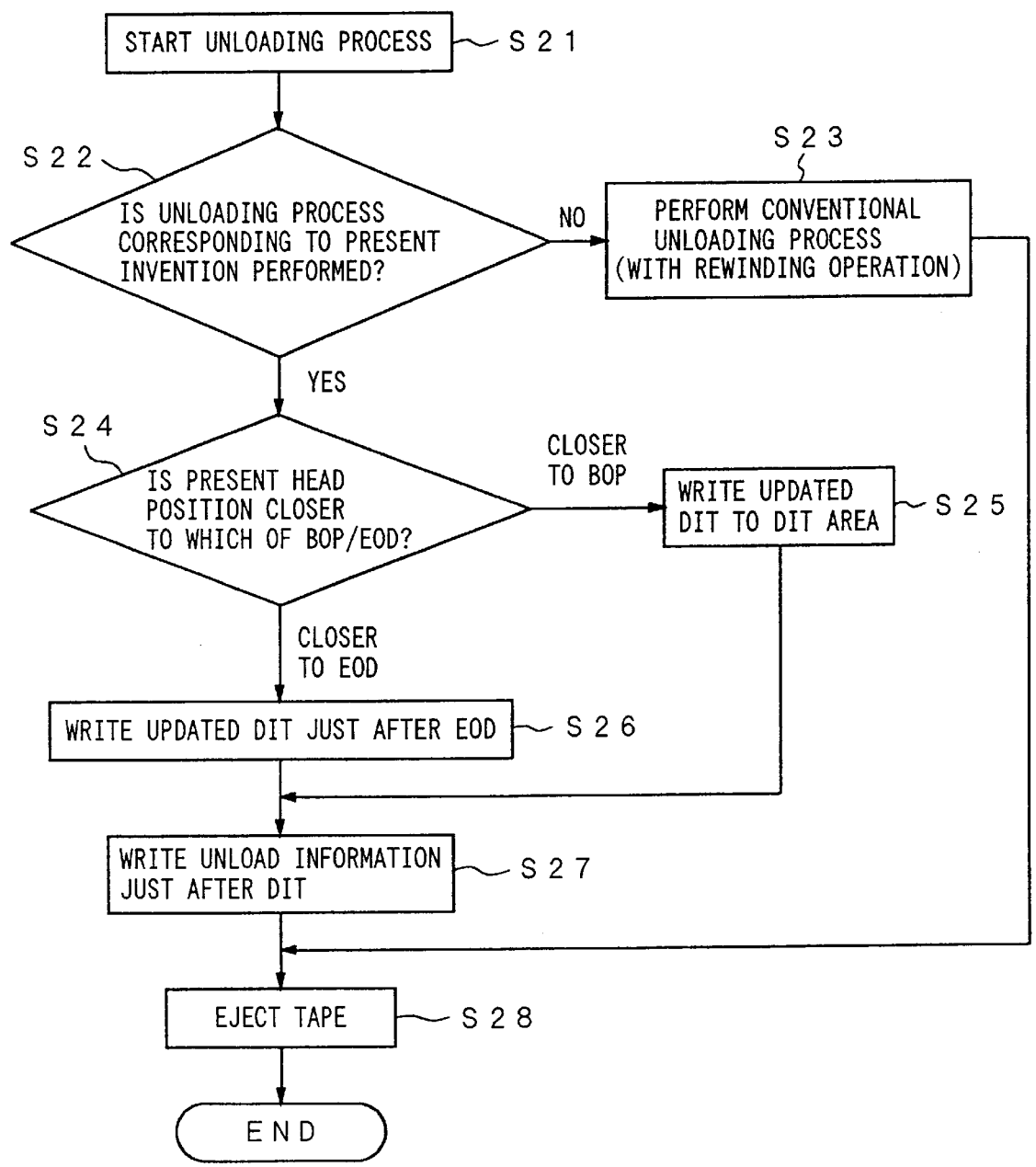
FIG. 17 is a flow chart for explaining an unloading process according to the first embodiment of the present invention.

An object of the present invention is to solve such a problem. Next, with reference to FIGS. 15 and 16, the loading process according to a first embodiment of the present invention will be described. At step S1 of FIG. 15, a tape is inserted into the data recorder. When the SCSI controller 75 receives a load request from the host computer or when the user presses a particular button, the main CPU 61 detects through the PIO 65 that the load request has been received or the particular button has been pressed. As a result, the main CPU 61 starts the loading process. In this case, as shown in FIG. 16A, the head is placed at the initial position of the tape that has been unloaded (the details will be described later).

The main CPU 61 requests through the two-port RAM 70 the sub CPU 81 to read the present ID value from the tape. Thus, the sub CPU 81 obtains the present ID value (IDR) from the drive through the RS422 (87). The sub CPU 81 sends the value to the main CPU 61 through the two-port RAM 70. In reality, at step S2 of FIG. 15 and as shown in FIG. 16B, a process for slightly rewinding the tape (for example, 20-IDs) is performed.

The main CPU 61 determines whether or not the present position is the tape top position (at step S3). When the present position is the tape top position, the main CPU 61 performs the above-described conventional loading process (at step S4). When the present position is not the tape top position, the flow advances to step S5. At step S5, the process according to the present invention is performed.

The main CPU 61 issues a data read request to the sub CPU 81 through the two-port RAM 70. Thus, at step S5 and as shown in FIG. 16C, the tape is slightly fast-forwarded (around 20-IDs). Thus, the present ID value (IDR) is obtained from the tape (at step S6). Thereafter, at step S7 and as shown in FIG. 16D, the head is moved to the position of which several 10-IDs to several 100-IDs (for example, 100-IDs are subtracted from the obtained ID value. Next, at step S8 and as shown in FIG. 16E, data for 1-ID is read from the position of the head. The DMA controller 89 stores the read data to the bank memory 80.

The main CPU 61 analyzes the data stored in the bank memory 80. In the analysis, at step S9, the main CPU 61 determines whether or not unload information is stored in the bank memory 80. When the unload information is not stored in the bank memory 80, the flow advances to step S4 (conventional loading process). When the unload information is stored in the bank memory 80, the main CPU 61 obtains the position of a DIT from the unload information (at step S10). As will be described later, the unload information is tape format information.

Thereafter, the main CPU 61 requests the sub CPU 81 to read data from the obtained position. At step S11 and as shown in FIG. 16F, a DIT is read. The DMA controller 89 stores the data of the DIT to the bank memory 80. The main CPU 61 sends the data stored in the bank memory 80 to the RAM 71. At step S12, the main CPU 61 reads the last physical ID (equivalent to the position of the EOD) of the data block contained in a VIT from the data stored in the RAM 71 and causes the sub CPU 81 to move the head to the last physical ID. As a result, the tape is prerolled to the position of the EOD and the loading process is completed.

FIG. 16G shows the position of the head in the case that the loading process is completed. Data of each table of the DIT stored in the memory RAM 71 is always updated corresponding to the operation of the data recorder.

As is clear from the comparison of FIGS. 13A and 16G, when the tape that has been unloaded is loaded according to the present invention, the moving distance of the head can be reduced. Thus, the speed of the loading process can be increased.

Next, with reference to FIGS. 17 and 18A–E, the unloading process according to the present invention will be described. When the host computer issues an unload request, the main CPU 61 detects through the SCSI controller 75 that the external unload request has been received. When the user presses an unload button, the main CPU 61 detects through the PIO 65 that the load button has been pressed. As a result, the main CPU 61 starts the unloading process (at step S21).

Thereafter, the flow advances to step S22. At step S22, the main CPU 61 determines whether or not the unloading process according to the present invention is performed. Since a communication protocol used for the unload request received from the host computer predesignates either the unloading process according to the present invention or the conventional unloading process, such a determination can be performed by the main CPU 61 that analyzes the contents of the data of the unload request received through the SCSI controller 75. In addition, the main CPU 61 determines that the unload request performed by the unload button is the unload request according to the present invention. When the unloading process is not the unloading process according to the present invention, the flow advances to step S23. At step S23, the main CPU 61 performs the conventional unloading process. In other words, the tape is prerolled (rewound) from the present position to the beginning of the DIT. In the case of the unloading process according to the present invention, the flow advances to step S24.

Figure 18A:
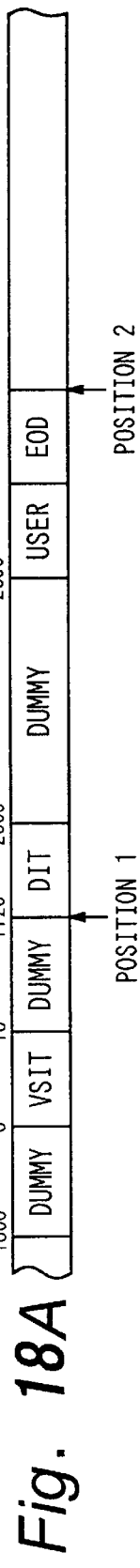
FIGS. 18A to 18E are schematic diagrams for explaining the unloading process according to the first embodiment of the present invention.

At step S24, the main CPU 61 determines the present head position is closer to which of two positions shown in FIG. 18A corresponding to respective physical IDs. One of the positions is a BOP (Beginning Of Partition) that is the beginning of the logical volume, more practically, the DIT area. The other is the position just after the EOD. When the unloading process is performed after the writing sequence, the head is placed just after the EOD. In the middle of the read sequence, the head may be placed near the beginning of a logical volume.

Figure 18B:
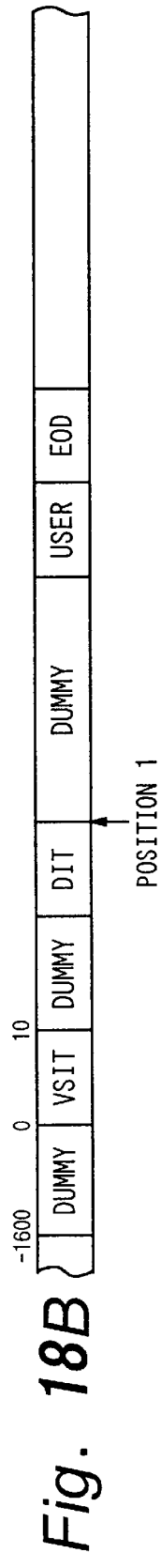
Figure 18C:
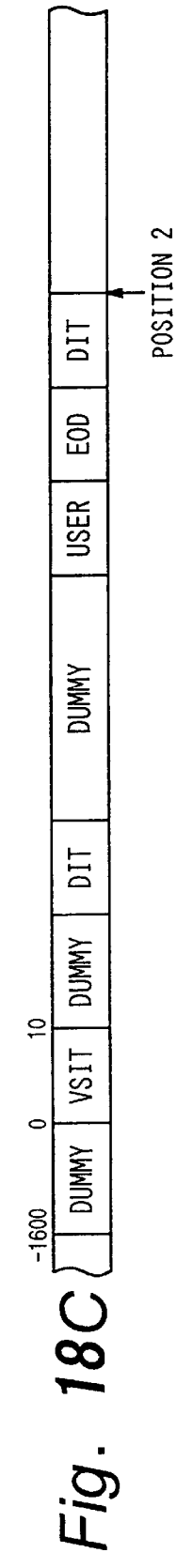

When the present head position is closer to the BOP, the flow advances to step S25. At step S25, the updated DIT is written to the DIT area. In the write sequence, the DIT is repeatedly written seven times. FIG. 18B shows the state that the DIT is written. When the present head position is closer to the EOD, the flow advances to step S26. At step S26, the updated DIT is written just after the EOD. In this write sequence, as with the DIT at the beginning of a logical volume, the DIT is repeatedly written seven times. FIG. 18C shows the case that the DIT is written at step S26.

Figure 18D:
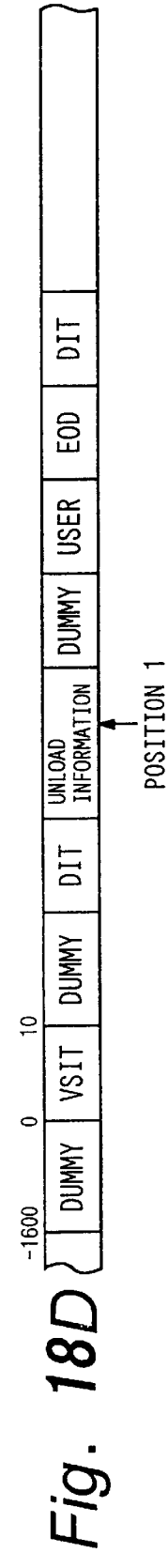
Figure 18E:
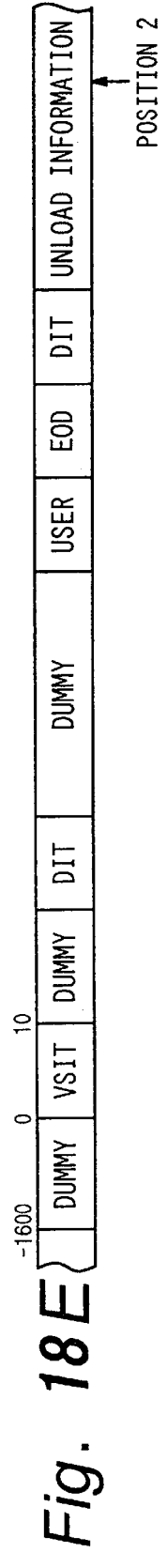

At step S27, the unload information is written just after the DIT that has been written at steps S25 and S26. FIG. 18D shows the state that the unload information is written just after the DIT that has been written at step S25 (shown in FIG. 18B). FIG. 18E shows the state that the unload information is written just after the DIT that has been written at step S26 (shown in FIG. 18C). After the unload information is written, the flow advances to step S28. At step S28, the tape is ejected. In other words, according to the present invention, in the state that the head is placed in the record area of the unload information, the eject operation is performed. As a result, the unloading process is completed.

FIG. 19 shows an example of the unload information. The unload information is data of which asterisked words (*) are added to a VSIT (Volume Set Information Table). Physical IDs of valid DITs (recorded on the tape when the unloading process is performed) of individual volumes are written to the unload information as in words 66, 70, . . . , and 4158. In addition, FIG. 19 shows data for 1-ID. On the tape, the unload information is repeatedly recorded around several hundred times (multiplex-recorded). If the cassette tape is ejected at the position of the unload information, it may be damaged. To prevent the unload information from being damaged, such a recording method is used. The length of the tape that is multiplex-recorded is around 1.5 times of the effective length of the tape transport so as to effectively prevent the concentration of a damage error.

Figure 20A:
FIGS. 20A to 20C are schematic diagrams for explaining the first embodiment of the present invention.
Figure 20B:
Figure 20C:
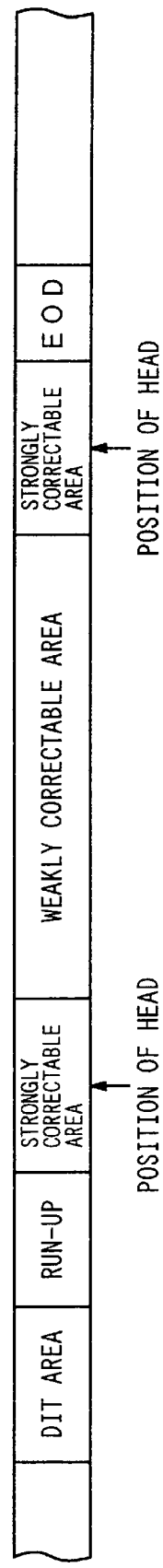

As with the multiplex-recording method, it should be noted that the unload information may be encoded with a proper error correction code. FIG. 20A shows the layout of a conventional logical volume. FIG. 20B shows a strongly correctable area disposed in a logical volume. The strongly correctable area is a user data area that has a strong area correcting code so as to provide highly correcting performance. Referring to FIG. 20B, a weakly correctable area is also disposed. The weakly correctable area has a correcting performance weaker than the strongly correctable area. Unload information is disposed in the strongly correctable area. When a cassette tape is ejected in such a manner that the head is placed in the strongly correctable area, the unload information can be protected.

According to the first embodiment, in the unloading process, it is not necessary to rewind the tape to the tape top position. Thus, the unloading process can be quickly performed. In particular, in the case of a large capacity medium such as a magnetic tape, this effect is remarkable. In addition, since the tape is unloaded at the position of the head where the unloading process is started, the unloading process can be quickly performed.

Next, a second embodiment of the present invention will be described. In the second embodiment, as with the first embodiment, it is not necessary to rewind the tape to the tape position. In the second embodiment, tape information written in the track set of the VIT of a DIT is used as unload information. In the first embodiment, the unload information is recorded on the tape. In contrast, in the second embodiment, the unload information is stored in the memory (S-RAM 72) rather than recorded on the tape.

FIG. 21 shows the contents of a sub-code area of the VIT of a DIT. A tape initial number (tape unique value assigned upon initialization of the tape) is written as word 14 of the sub-code area. As shown in FIG. 23, the initial number of a volume (unique value of a tape assigned upon initialization of a volume) is written to word 255 of the VIT. In this embodiment, the tape information of the VIT (namely, the tape initial number and the volume initial number) is used.

Figure 26:
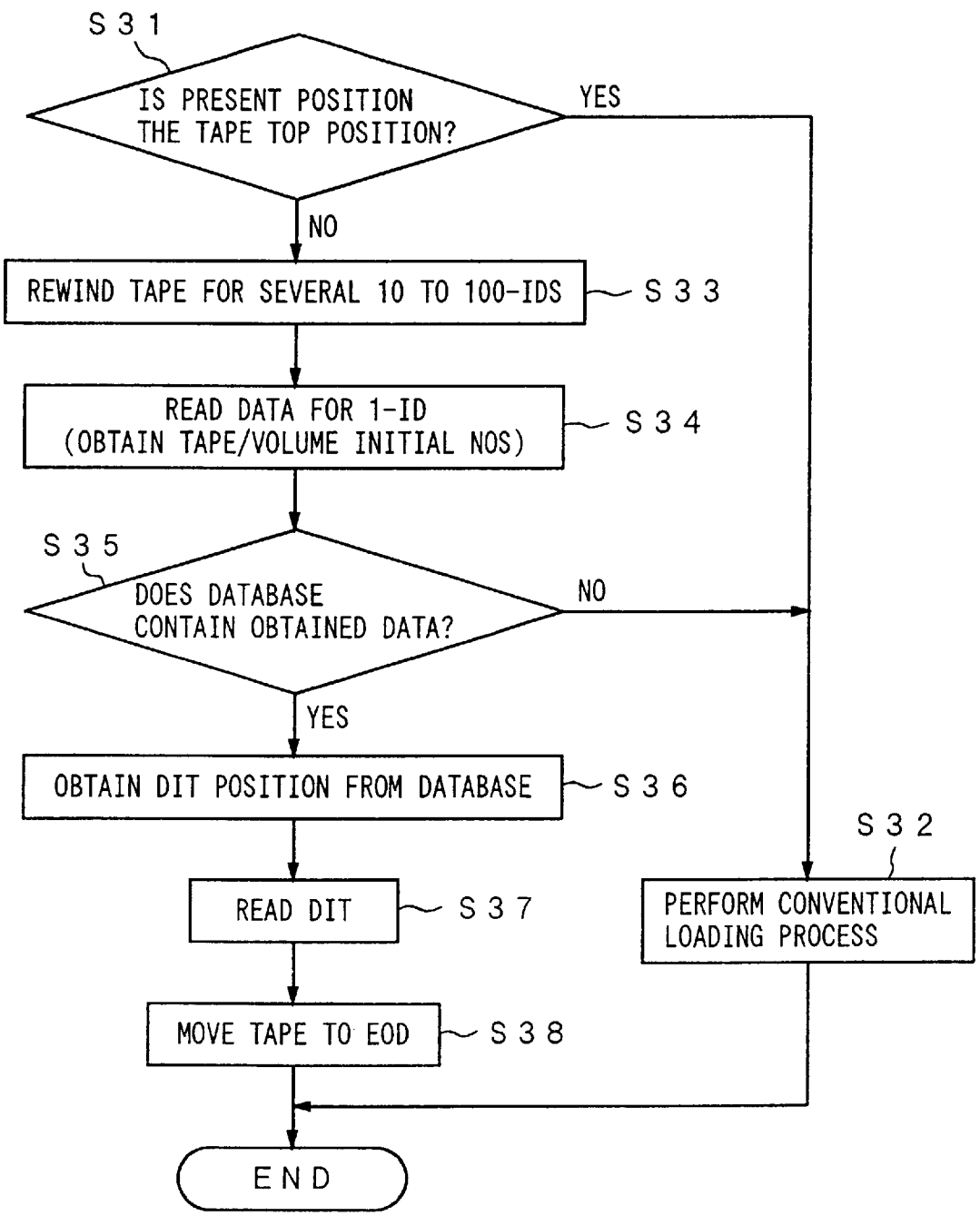
FIG. 26 is a flow chart for explaining the loading process according to a second embodiment of the present invention.

Next, with reference to FIGS. 26 and 27F, the loading process according to the second embodiment of the present invention will be described. After a tape is inserted into the data recorder, when the main CPU 61 receives the load request from the host computer through the SCSI controller 75, the main CPU starts the loading process. Alternatively, when the user presses the load button, the main CPU 61 determines through the PIO 65 that the load button has been pressed. Thus, the main CPU 61 starts the loading process.

Thereafter, the main CPU 61 requests the sub CPU 81 to read the present ID value from the tape through the two-port RAM 70. Thus, the sub CPU 81 obtains the present ID value (IDR) through the RS422 (87) and sends the value to the main CPU 61 through the two-port RAM 70.

The main CPU 61 determines whether or not the present position is the tape top position corresponding to the obtained data (at step S31). When the present position is the tape top position, the main CPU 61 performs the above-described conventional loading process (at step S32). When the present position is not the tape top position, the flow advances to step S33. Thus, at step S33, the loading process according to the present invention is performed. In this case, as shown in FIG. 27A, the head is placed in the initial position of the tape that has been unloaded (the unloading process of the second embodiment will be described later).

The main CPU 61 requests through the two-port RAM 70 the sub CPU 81 to read data. Thus, at step S33, the sub CPU 81 rewinds the tape for several 10-IDs to 100-IDs. FIG. 27B shows the position of the head of which the tape has been rewound. Thereafter, the flow advances to step S34. At step S34, data for 1-ID of the VIT of the DIT is read. FIG. 27C shows the position of the head at step S34. The VIL of the DIT contains the above-described data. Thus, at step S34, a tape initial number and a volume initial number (a random number upon initialization) are obtained. The DMA controller 89 stores the read data to the bank memory 80.

Figure 27:
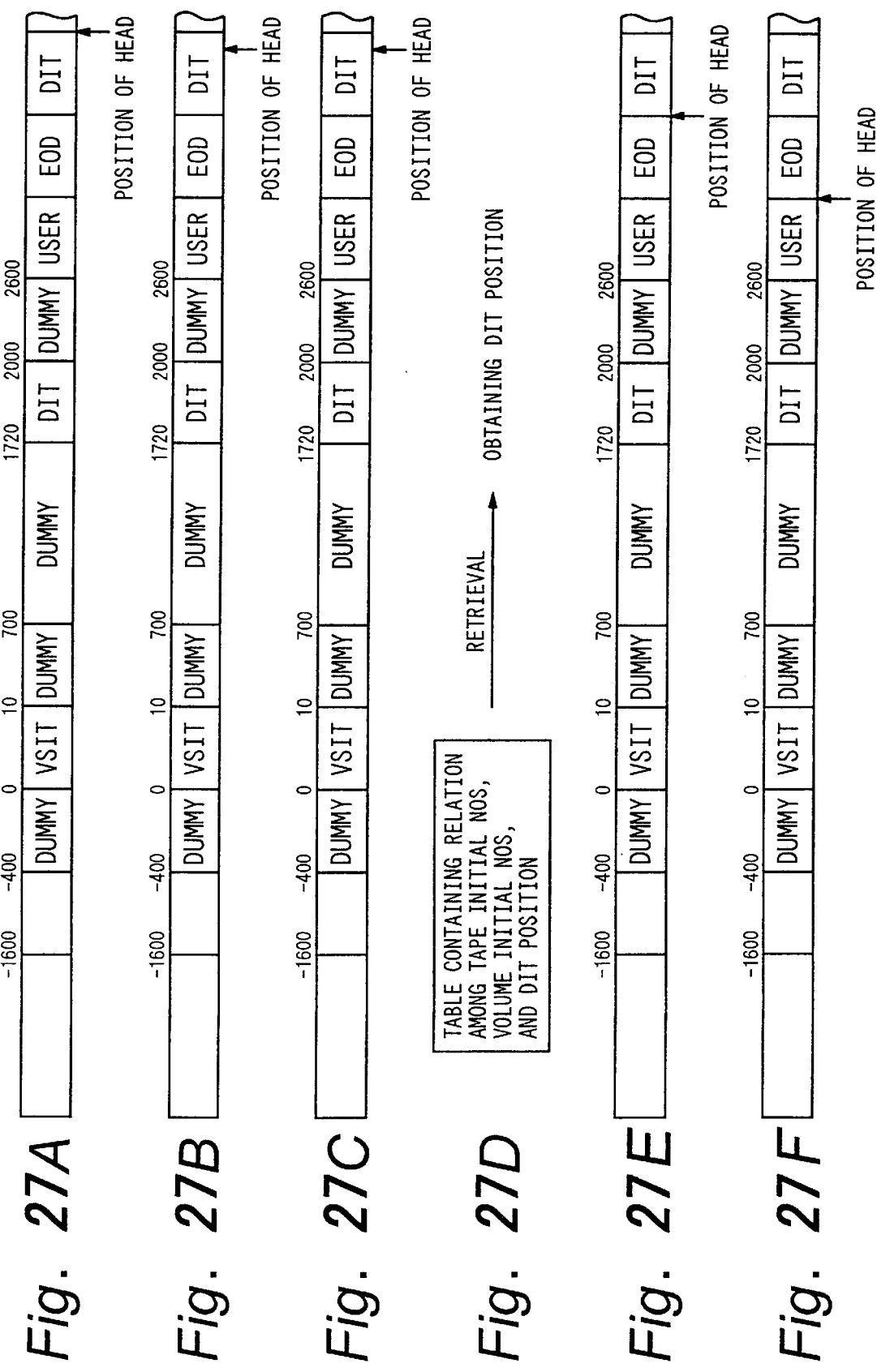
FIGS. 27A to 27F are schematic diagrams for explaining the loading process according to the second embodiment of the present invention.

The main CPU 61 obtains the tape initial number and the volume initial number from the data stored in the bank memory 80 and determines whether or not the database in the S-RAM 72 contains the same data (at step S35 and as shown in FIG. 27D). When the unloading process is performed, a tape initial number, a volume initial number, and a DIT physical ID are written to the S-RAM 72. As described above, the S-RAM 72 is a non-volatile memory that holds data even after the power is turned off. When the obtained initial numbers are not contained in the database, the conventional process is performed.

When the obtained initial number is contained in the database, the flow advances to step S36. At step S36, the main CPU 61 obtains the position information (physical ID) of the DIT corresponding to the obtained initial numbers. Thereafter, the main CPU 61 causes the sub CPU 81 to read the DIT from the obtained DIT position information as the start point. The DMA controller 89 stores the DIT to the bank memory 80. The main CPU 61 sends the data stored in the bank memory 80 to the RAM 71. The flow advances to step S38. At step S38, the main CPU 61 causes the sub CPU 81 to read the last physical ID (equivalent to the position of the EOD) of the data block included in the VIT from the data sent to the RAM 71 and to move the tape to the position of the last physical ID. Thus, the head is prerolled to the position of the EOD. As a result, the loading process is completed. FIG. 27F shows the position of the head of which the loading process is completed.

Figure 28:
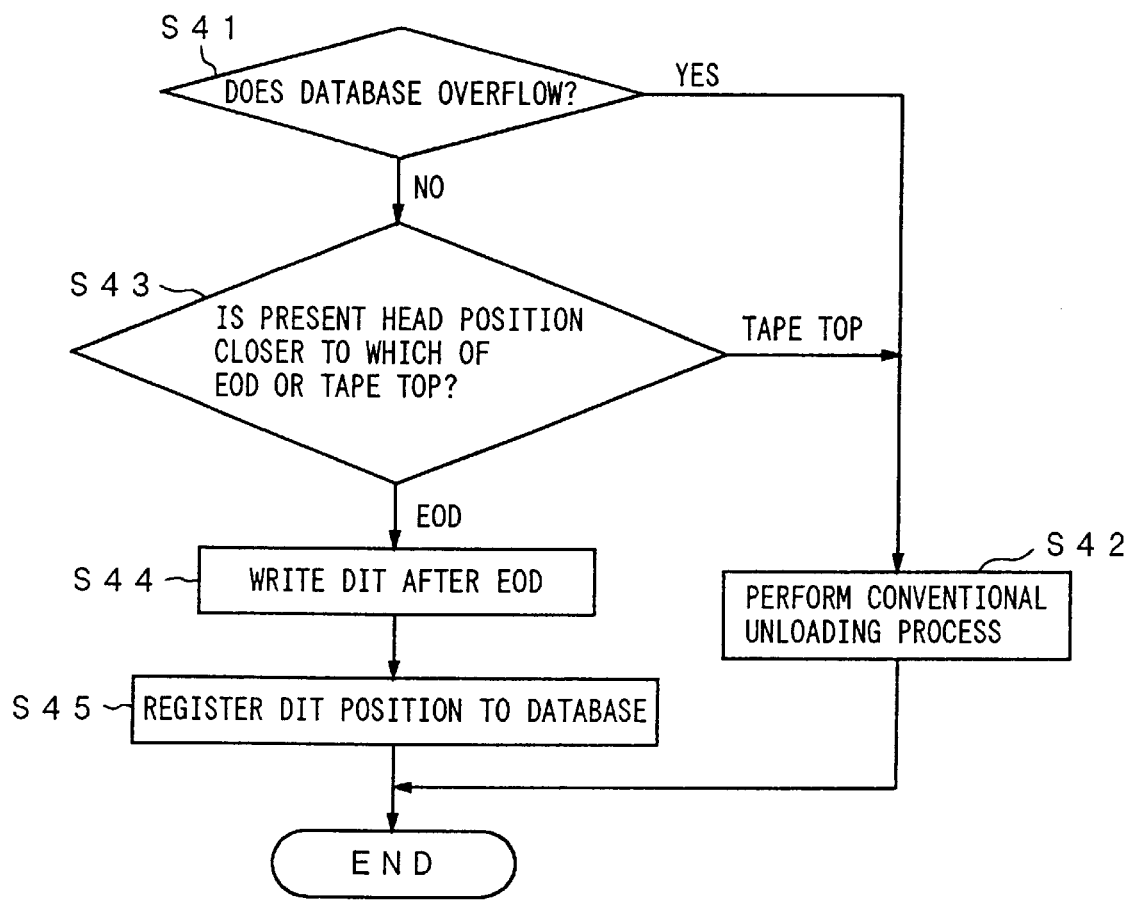
FIG. 28 is a flow chart for explaining the unloading process according to the second embodiment of the present invention.

Next, with reference to FIGS. 28 to 30, the unloading process according to the second embodiment of the present invention will be described. When the main CPU 61 receives the unload request from the host computer through the SCSI controller 75, the main CPU 61 starts the unloading process. Alternatively, when the user presses the unload button, the main CPU 61 determines through the PIO 65 that the unload button has been pressed. Thus, the main CPU 61 starts the unloading process.

At step S41 (shown in FIG. 28), the main CPU 61 determines whether or not the database in the S-RAM 72 overflows. When the S-RAM 72 overflows, since a new database cannot be generated, the main CPU 61 cannot perform the loading process with the database at a high speed. In this case, the flow advances to step S42. At step S42, the main CPU 61 performs the conventional unloading process. When the S-RAM 72 does not overflow, the flow advances to step S43.

At step S43, the main CPU 61 determines the present head position is closer to which of the tape top (BOT) or the EOD. When the present head position is closer to the tape top position, the flow advances to step S42. At step S42, the main CPU 61 performs the conventional unloading process. When the present head position is closer to the EOD, the head is prerolled from the present position to the next EOD position. In FIG. 29A, I represents the position of the head after the head has been prerolled.

Next, the main CPU 61 requests the sub CPU 81 to write a DIT through the two-port RAM 70. Thereafter, the flow advances to step S44. At step S44, the sub CPU 81 writes the DIT just after the EOD. As with the DIT at the top of the logical volume, the DIT is repeatedly written seven times. FIG. 29B shows the state that the DIT has been written seven times at step S44.

Thereafter, the flow advances to step 45. At step S45, the DIT physical ID (that represents the DIT position), the tape initial number, and the volume initial number are registered to the database in the S-RAM 72. When the unload button is pressed or the unload command is issued, the main CPU 61 issues an eject request. As a result, the ejecting operation is performed and the unloading process is completed.

FIG. 30 shows an example of the database. The database contains a table representing the relation among tape initial numbers, volume initial numbers, and DIT positions (physical IDs). The database is stored in the S-RAM 72, which is a non-volatile memory. In the second embodiment, as described above, when the unloading process is performed, it is not necessary to rewind the tape to the tape top position. As with the first embodiment of the present invention, according to the present invention, the loading process and the unloading process can be quickly performed.

The present invention can be applied to a data recorder that performs a sequential access operation as well as a rotating head type data recorder.

In addition, the data format having an attribute of tape marks is not limited to the above-described embodiments. Instead, various formats can be used.

According to the present invention, when the unloading process is performed, the process for rewinding the tape to the tape top position is not required. Thus, the unloading process can be quickly performed. In addition, in the next loading process, the tape can be moved to a desired DIT position in a short time. Thus, the loading process can be quickly performed.

Moreover, according to the present invention, since the DIT positions that are accessed in the loading/unloading processes are not fixed, the tape can be remarkably prevented from being damaged.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A digital data recording/reproducing apparatus for recording/reproducing digital data to/from a predetermined area of a plurality of divided record/reproduction areas of a tape-shaped recording medium with a record/reproduction head, each of the divided record/reproduction areas having a first information table including the digital data, and end information representing a record end point and first management information for a respective divided record/reproduction area, the tape-shaped recording medium having a second information table including second management information for managing the digital data of the divided record/reproduction areas and information representing a position of the first information table on the tape-shaped recording medium, said digital data recording/reproducing apparatus comprising:

means for generating a third information table including updated contents of the first information table;

means for generating a fourth information table including position information representing a position of the third information table on the tape-shaped recording medium;

means for determining whether the record/reproduction head is closer to the first information table position or to an end information position when an unloading operation is requested; and controlling means for recording, in response to said determining means, the third information table and the fourth information table at a predetermined position of the divided record/reproduction areas when said digital data recording/reproducing apparatus is requested to perform the unloading operation, said controlling means being adapted for unloading the tape-shaped recording medium after the third information table and the fourth information table have been recorded.

2. The digital data recording/reproducing apparatus as set forth in claim 1, wherein the first information table is recorded at a top portion of each of the divided record/reproduction areas, the digital data being recorded after the first information table, and the end information being recorded after the digital data and wherein said controlling means is adapted for recording the third information table and the fourth information table to the record position determined by said determining means.

3. The digital data recording/reproducing apparatus as set forth in claim 2, wherein said controlling means is adapted for rewriting the first information table to the third information table and for recording the fourth information table after the rewritten third information table when the first information table position is closer to the record/reproduction head.

4. The digital data recording/reproducing apparatus as set forth in claim 2, wherein said controlling means is adapted for recording the third information table after the end information and the fourth information table after the third information table when the end information position is closer to the record/reproduction head.

5. The digital data recording/reproducing apparatus as set forth in claim 1, wherein the position information representing the position of the third information table on the tape-shaped recording medium represents a top of the third information table.

6. The digital data recording/reproducing apparatus as set forth in claim 5, wherein the fourth information table includes contents of the second information table.

7. The digital data recording/reproducing apparatus as set forth in claim 1, wherein said controlling means is adapted for repeatedly recording the fourth information table a plurality of times.

8. The digital data recording/reproducing apparatus as set forth in claim 7, wherein said controlling means is adapted for repeatedly recording the fourth information table for a length larger than a length of a tape transport of said digital data recording/reproducing apparatus.

9. A digital data recording/reproducing apparatus with a record/reproduction head for recording/reproducing digital data, comprising:

a tape-shaped recording medium having a plurality of divided record/reproduction areas to/from which the digital data is recorded, each of the divided record/reproduction areas having a third information table including updated contents of a first information table including the digital data, end information representing a record end point and first management information for a respective divided record/reproduction area, and a fourth information table including at least position information representing a position of the third information table on said tape-shaped recording medium, said tape-shaped recording medium further having a second information table including second management information for managing the digital data of the divided record/reproduction areas and information representing a position of the first information table on said tape-shaped recording medium;

moving means for moving said tape-shaped recording medium in response to a control signal; and controlling means for reading the fourth information table on said tape-shaped recording medium, for detecting the position information of the third information table from the fourth information table, for controlling said moving means corresponding to the detected position information so as to move said tape-shaped recording medium, for reading the third information table from the moved tape-shaped recording medium, for detecting a position of the end information on said tape-shaped recording medium from the read third information table, for controlling said moving means corresponding to the detected position so as to move said tape-shaped recording medium, and for placing the record/reproduction head after the end information when said digital data recording/reproducing apparatus is requested to perform a loading operation.

10. The digital data recording/reproducing apparatus as set forth in claim 9, wherein said controlling means further comprises means for determining whether the record/reproduction head is placed at a top of said tape-shaped recording medium when the digital data recording/reproducing apparatus is requested for the loading operation, and wherein said controlling means is activated only when the record/reproduction head is not placed at the top of said tape-shaped recording medium.

11. The digital data recording/reproducing apparatus as set forth in claim 9, wherein said controlling means further comprises means for determining whether the fourth information table has been recorded on said tape-shaped recording medium, and wherein said controlling means is activated only when the fourth information table has been recorded.

12. A digital data recording/reproducing method for recording/reproducing digital data to/from a predetermined area of a plurality of divided record/reproduction areas of a tape-shaped recording medium with a record/reproduction head, each of the divided record/reproduction areas having a first information table including the digital data, and end information representing a record end point and management information for a respective divided record/reproduction area, the tape-shaped recording medium having a second information table including second management information for managing the digital data of the record/reproduction areas and information representing a position of the first information table on the tape-shaped recording medium, said method comprising the steps of:

generating a third information table including updated contents of the first information table;

generating a fourth information table including position information representing a position of the third information table on the tape-shaped recording medium;

determining whether the record/reproduction head is closer to the first information table position or to an end information position when an unloading operation is requested;

recording, based on said determining step, the third information table and the fourth information table at a predetermined position of the divided record/reproduction areas when the unloading operation is requested; and unloading the tape-shaped recording medium after the third information table and the fourth information table have been recorded.

13. The digital data recording/reproducing method as set forth in claim 12, wherein the first information table is recorded at a top portion of each of the record/reproduction areas, the digital data being recorded just after the first information table, and the end information being recorded after the digital data.

14. The digital data recording/reproducing method as set forth in claim 13, further comprising rewriting the first information table to the third information table and recording the fourth information table after the rewritten third information table when the first information table position is closer to the record/reproduction head.

15. The digital data recording/reproducing method as set forth in claim 14, further comprising recording the third information table after the end information and the fourth information table after the third information table when the end information position is closer to the record/reproduction head.

16. The digital data recording/reproducing method as set forth in claim 12, further comprising the steps of:

determining whether the unloading operation is in a first mode or a second mode, said recording step being performed when the determined unloading operation is in the first mode, and rewriting the first information table to the third information table and rewinding the tape-shaped recording medium to a top position when the determined unloading operation is in the second mode.

17. The digital data recording/reproducing method as set forth in claim 12, wherein said recording step further comprises repeatedly recording the fourth information table a plurality of times.

18. The digital data recording/reproducing method as set forth in claim 17, wherein the fourth information table is repeatedly recorded for a length larger than a length of a tape transport.

19. A digital data recording/reproducing method using a record/reproduction head for recording/reproducing digital data, said method comprising the steps of:

loading a tape-shaped recording medium having a plurality of divided record/reproduction areas to/from which the digital data is recorded, each of the divided record/reproduction areas having a third information table including updated contents of a first information table including the digital data, end information representing a record end point and first management information for a respective divided record/reproduction area, and a fourth information table including at least position information representing a position of the third information table on said tape-shaped recording medium, said tape-shaped recording medium further having a second information table including second management information for managing the digital data of the divided record/reproduction areas and information representing a position of the first information table on said tape-shaped recording medium;

reading the fourth information table;

detecting the position information representing the position of the third information table on said tape-shaped recording medium from the read fourth information table;

moving said tape-shaped recording medium corresponding to the detected position information;

reading the third information table from the moved tape-shaped recording medium;

detecting a position of the end information on said tape-shaped recording medium from the read third information table; and moving said tape-shaped recording medium corresponding to the detected end information position so as to place the record/reproduction head after the end information.

20. The digital data recording/reproducing method as set forth in claim 19, further comprising determining whether said tape-shaped recording medium is at a top when the loading operation is requested, wherein said step of reading the fourth information table is performed only when the record/reproduction head is not placed at the top of said tape-shaped recording medium.

21. The digital data recording/reproducing method as set forth in claim 19, further comprising determining whether the fourth information table has been recorded on said tape-shaped recording medium, wherein said step of reading the fourth information table is performed only when the fourth information table has been recorded on said tape-shaped recording medium.

22. A digital data recording/reproducing apparatus for recording/reproducing digital data to/from a predetermined area of a plurality of divided record/reproduction areas of a tape-shaped recording medium with a record/reproduction head, each of the divided record/reproduction areas having a first information table including the digital data, and end information representing a record end point and first management information for a respective divided record/reproduction area, the tape-shaped recording medium having a second information table including second management information for managing the digital data of the divided record/reproduction areas and information representing a position of the first information table on the tape-shaped recording medium, said digital data recording/reproducing apparatus comprising:

means for generating a third information table including updated contents of the first information table;

memory means for storing the position information of the third information table;

means for determining whether the record/reproduction head is closer to the first information table position or to an end information position when an unloading operation is requested; and controlling means for recording, in response to said determining means, the third information table at a predetermined position of the divided record/reproduction areas, said controlling means being adapted for storing the position information representing the position of the third information table to said memory means, and for unloading the tape-shaped recording medium.

23. The digital data recording/reproducing apparatus as set forth in claim 22, wherein the first information table is recorded at a top portion of each of the divided record/reproduction areas, the digital data being recorded after the first information table, and the end information being recorded just after the digital data.

24. The digital data recording/reproducing apparatus as set forth in claim 23, wherein said controlling means is adapted for rewriting the first information table to the third information table when the first information table position is closer to the record/reproduction head.

25. The digital data recording/reproducing apparatus as set forth in claim 23, wherein said controlling means is adapted for recording the third information table after the end information when the end information position is closer to the record/reproduction head.

26. The digital data recording/reproducing apparatus as set forth in claim 22, wherein the position information representing the position of the third information table on the tape-shaped recording medium represents a top of the third information table.

27. The digital data recording/reproducing apparatus as set forth in claim 22, wherein said controlling means is adapted for causing said memory means to store a first fixed value included in the first information table and representing the tape-shaped recording medium, and a second fixed value representing the digital data recorded in the divided record/reproduction areas.

28. The digital data recording/reproducing apparatus as set forth in claim 27, wherein said controlling means is adapted for detecting whether an overflow takes place in said memory means when said controlling means causes said memory means to store the position information representing the position of the third information table and said first and second values, said controlling means being adapted for rewinding the tape-shaped recording medium to the top when the overflow of said memory means is detected.

29. A digital data recording/reproducing apparatus with a record/reproduction head for recording/reproducing digital data, comprising:

a tape-shaped recording medium having a plurality of divided record/reproduction areas to/from which the digital data is recorded, each of the divided record/reproduction areas having a third information table including updated contents of a first information table including the digital data, end information representing a record end point and first management information for a respective divided record/reproduction area, said tape-shaped recording medium further having a second information table including second management information for managing the digital data of the divided record/reproduction areas and information representing a position of the first information table on said tape-shaped recording medium;

memory means for storing the position information representing the position of the third information table;

moving means for moving said tape-shaped recording medium in response to a control signal; and controlling means for reading the position information representing the third information table stored in said memory means, for controlling said moving means corresponding to the detected position information so as to move said tape-shaped recording medium, for reading the third information table from the moved tape-shaped recording medium, for detecting a position of the end information on said tape-shaped recording medium from the read third information table, for controlling said moving means corresponding to the detected position so as to move said tape-shaped recording medium, and for placing the record/reproduction head after the end information when said digital data recording/reproducing apparatus is requested to perform a loading operation.

30. The digital data recording/reproducing apparatus as set forth in claim 29, wherein said controlling means further comprises means for determining whether the record/reproduction head is placed at a top of said tape-shaped recording medium, and wherein said controlling means is activated only when the record/reproduction head is not placed at the top of said tape-shaped recording medium.

31. The digital data recording/reproducing apparatus as set forth in claim 29, wherein said memory means is adapted for storing a first fixed value included in the first information table and representing the tape-shaped recording medium, and a second fixed value representing the digital data recorded in the divided record/reproduction areas, the first fixed value and the second fixed value being stored when the unloading operation is performed, and wherein said controlling means is adapted for reading the first and second fixed values from the third information table, for determining whether the read values are equal to those stored in said memory means, and for moving the tape-shaped recording medium to a position represented by the position information of the third information table when the read values are equal to those stored in said memory means.

* * * * *